(12) United States Patent
Taylor et al.

(10) Patent No.: US 10,005,522 B2
(45) Date of Patent: Jun. 26, 2018

(54) CONNECTOR

(71) Applicant: Flintstone Technology Limited, Dundee (GB)

(72) Inventors: Richard Taylor, Cumbria (GB); Andrew Clayson, Dundee (GB)

(73) Assignee: Flintstone Technology Limited, Dundee (GB)

(*) Notice: Subject to any disclaimer, the term of this patent is extended or adjusted under 35 U.S.C. 154(b) by 181 days.

(21) Appl. No.: 14/779,656

(22) PCT Filed: Mar. 25, 2014

(86) PCT No.: PCT/GB2014/050940
§ 371 (c)(1),
(2) Date: Sep. 24, 2015

(87) PCT Pub. No.: WO2014/155094
PCT Pub. Date: Oct. 2, 2014

(65) Prior Publication Data
US 2016/0052604 A1  Feb. 25, 2016

(30) Foreign Application Priority Data
Mar. 25, 2013  (GB) .................................. 1305420.0

(51) Int. Cl.
| B63B 21/20 | (2006.01) |
| B63B 21/50 | (2006.01) |
| F16G 15/08 | (2006.01) |
| E02D 27/10 | (2006.01) |
(Continued)

(52) U.S. Cl.
CPC ............. B63B 21/20 (2013.01); B63B 21/50 (2013.01); B63B 21/507 (2013.01); E02D 27/10 (2013.01);
(Continued)

(58) Field of Classification Search
CPC ................................ B63B 21/20; B63B 21/10
See application file for complete search history.

(56) References Cited

U.S. PATENT DOCUMENTS 2,508,832 A * 5/1950 McAninch ................ F16D 1/04
403/355
3,905,190 A 9/1975 Pearlman
(Continued)

FOREIGN PATENT DOCUMENTS

| GB | 2 069 082 A | 8/1981 |
| GB | 2496700 A | 5/2013 |
(Continued)

OTHER PUBLICATIONS

International Search Report, International Application No. PCT/GB2014/050940, dated Jun. 6, 2014, 6 pp.
(Continued)

Primary Examiner — Andrew Polay
(74) Attorney, Agent, or Firm — Myers Bigel, P.A.

(57) ABSTRACT

The invention relates to a connector, such as a subsea connector (100), for connecting a line or lines such as mooring lines (140), to a subsea structure (145), such as a submerged turret loading or a submerged turret production buoy. The invention also relates to associated apparatus, structures and methods. The subsea connector (100) comprises a first portion (105) and a second portion (110) and means (115) for connecting the first (105) and second portions (110). The means (115) for connecting comprise at least part of a through-passage (120) in the second portion (110). The first portion may comprise means (125) for connection to one or more lines (140), such as mooring lines, allowing rotational movement around or about a transverse axis of the first portion (105) with respect to the line (140). The second portion (110) may comprise means (130) for connection to a subsea structure (145) allowing rotational
(Continued)

movement around or about a transverse axis of the second portion (110) with respect to the subsea structure (145). In some examples, the transverse axis of the first portion (105) may be substantially perpendicular to the transverse axis of the second portion (110).

38 Claims, 21 Drawing Sheets

(51) Int. Cl.
　　　*E02D 27/50*　　　(2006.01)
　　　*E02D 27/52*　　　(2006.01)
(52) U.S. Cl.
　　　CPC ............. *E02D 27/50* (2013.01); *E02D 27/52* (2013.01); *F16G 15/08* (2013.01); *B63B 2021/203* (2013.01)

(56) References Cited

U.S. PATENT DOCUMENTS

| | | |
|---|---|---|
| 4,676,696 A | 6/1987 | Laursen |
| 6,439,146 B2 * | 8/2002 | Seaman ................ B63B 21/50 |
| | | 114/200 |
| 6,582,157 B1 | 6/2003 | Takeuchi et al. |
| 6,663,320 B1 * | 12/2003 | Braud ................... B63B 21/22 |
| | | 114/230.2 |
| 2003/0143032 A1 | 7/2003 | Palmquist |
| 2006/0086303 A1 | 4/2006 | Palmquist |
| 2011/0229270 A1 | 9/2011 | Rios |
| 2012/0031320 A1 * | 2/2012 | Bauduin ............... B63B 21/502 |
| | | 114/264 |

FOREIGN PATENT DOCUMENTS

| | | |
|---|---|---|
| WO | WO 89/11415 A1 | 11/1989 |
| WO | WO 2008/002151 A1 | 1/2008 |
| WO | WO 2013/186553 A1 | 12/2013 |

OTHER PUBLICATIONS

Written Opinion of the International Searching Authority, International Application No. PCT/GB2014/050940, dated Jun. 6, 2014, 8 pp.

International Preliminary Report on Patentability, International Application No. PCT/GB2014/050940, dated Sep. 29, 2015, 9 pp.

\* cited by examiner

CONNECTOR

RELATED APPLICATIONS

This application is a 35 U.S.C. § 371 national stage application of PCT Application No. PCT/GB2014/050940, filed on Mar. 25, 2014, which claims priority from British Application No. 1305420.0 filed on Mar. 25, 2013, the contents of which are hereby incorporated herein by reference in their entireties. The above-referenced PCT International Application was published as International Publication No. WO 2014/155094 A1 on Oct. 2, 2014.

FIELD OF INVENTION

The present invention relates to a connector, such as a subsea connecter, for connecting a line or lines such as mooring lines, to a subsea structure, such as a submerged turret loading or a submerged turret production buoy. The invention also relates to associated apparatus, structures and methods.

BACKGROUND TO INVENTION

Mooring lines, e.g. wire, chain or synthetic mooring lines (such as polyester lines) used subsea, for example, in the oil, gas, offshore wind, or tidal energy industries, etc., can be attached to those subsea structures by means of a connector. The mooring of such structures may be permanent. However, corrosion of the wires or lines used for mooring may require the replacement of the corroded lines or wires. When such structures are deployed beyond a depth where it is commercially acceptable to use a diver, then such connection may need to be established using a remotely operated vehicle (ROV), which may be used to both connect and disconnect such lines.

Even when not operating beyond a diver depth, better connectors for use with ROVs may be desired, since many operators choose not to use divers, even where practical.

There remains a need for a new, simple, robust and easy to use connector.

SUMMARY OF INVENTION

According to a first aspect there is provided a subsea connector. The connector may comprise a first portion and a second portion. The connector may comprise means for connecting the first and second portions, comprising at least part of a through-passage in the second portion.

The first portion may comprise means for connecting or connection to one or more lines, such as mooring lines, allowing rotational movement around or about a transverse axis of the first portion with respect to the line.

The second portion may comprise means for connecting or connection to a subsea structure allowing rotational movement around or about a transverse axis of the second portion with respect to the subsea structure.

The transverse axis of the first portion may be substantially perpendicular to the transverse axis of the second portion.

The second portion may comprise the through passage.

At least part of the first portion may be receivable within the at least part of the through-passage.

The first portion of the subsea connector may comprise means for connecting to one or more lines, such as one or more mooring lines.

The second portion of the subsea connector may comprise means for connecting to a subsea structure, e.g. a submerged or partially submerged turret loading or a submerged turret production buoy.

The subsea connector may further comprise means for aligning, e.g. self-aligning the first portion and the second portion with respect to one another.

The through-passage may be capable of (threadably) receiving a work line or wire.

The first portion may comprise a male part.

The second portion may comprise a female part.

The means for connecting may comprise means for releasably connecting.

The means for aligning the first and second portions may comprise first and second means carried by or provided on the first and second portions, respectively.

The first and second alignment means may co-act, in use, when the first and second portions are brought together.

The first alignment means may comprise at least one first protrusion.

The second alignment means may comprise at least one second protrusion. In some examples, the first and second protrusions may define a cam follower arrangement, such as a helical cam follower arrangement.

The at least one first and second protrusions may co-act, in use, and rotate the first and second portions with respect to one another around a longitudinal axis, when the first and second portions are brought together.

The male part may comprise a cylindrical portion.

The at least part of the through-passage may be a cylindrical bore e.g. an open bore.

The female part may comprise the at least part of the through passage, within which the male part or cylindrical portion may be received in a substantially tight or snug fit.

The first portion may comprise means for releasably connecting to the work line or wire. The line connecting means may be an inter-engaging coupling arrangement. The inter-engaging coupling arrangement may be configured for pulling or moving the first portion of the subsea connector towards the second portion. The line connecting means may comprise first and second line connection means.

The first line connection means may be configured for releasably engaging with the second line connection means. Alternatively, the second line connection means may be configured for releasably engaging with the first line connection means. The engagement between the first and second line connection means may be caused by tension created between the work line or wire and the first portion of the subsea connector.

The first line connection means may be provided by or carried on a free end of the line or wire. The first line connection means may comprise a first and second protrusion disposed on opposite sides of a plate member or attachment member of the wire or line. The first and second protrusions may be a first and second pin.

The male part may comprise an open recess or slot on a free end thereof. The second line connection means may be located or disposed within the open recess or slot of the male part.

The second line connection means may comprise a first and second retaining member. The first and second retaining members may be disposed on opposite sides, opposing each other, of the width of the open recess or slot. The first and second retaining members may comprise a further opening or recess adapted for receiving the first and second pins of the first line connection means. The opening or recess of the first and second retaining members may be adapted to face opposite to that of the male part, e.g. in a downward direction with respect to the first portion.

Alternatively, the second line connection means may comprise an elongate member or bar spanning the width of the open recess or slot.

Alternatively, the first line connection means may comprise a member for connecting to the elongate member or bar of the male part, such as a hook or the like.

In use, an ROV may run the work line or wire through the bore of the female part.

The ROV may connect the work line or wire, comprising the first line connection means, to the second line connection means of the male part.

In use, engagement between the first and second line connection means may be caused by tension in an upward direction created between the work line or wire and the first portion of the subsea connector, i.e. the first and second pins may co-act or engage with the first and second retaining members. Alternatively, the hook may engage with elongate member.

Subsequently, the ROV may pull the male part towards the female part such that the male part is inserted into the female part. A temporary sheave member may facilitate the pulling of the first portion towards the second portion.

In use, insertion of the male part into the female part may cause the first alignment means and second alignment means to rotationally co-act, thereby relatively (longitudinally) rotating the male part into a pre-selected or pre-determined rotational disposition in the female part.

The means for connecting the first portion and the second portion may comprise a first aperture in the male part, e.g. a pair of diametrically or width-wise spanning the cylindrical portion of the male part.

The means for connecting the first portion and the second portion may comprise at least one second aperture, e.g. a pair of diametrically opposed apertures, in the female part. The means for connecting the first portion and the second portion may comprise a pin, e.g. a load (bearing) pin, removably receivable within the first and second apertures when such are aligned.

The first and/or second apertures may be configured so as to provide a clearance or space, e.g. an increased clearance or space, between the pin and the first and/or second aperture during insertion of the pin. Alternatively or additionally, the first and/or second aperture may be configured so as to provide a contact area, e.g. an increased contact area, between the pin and the first and/or second apertures when the first portion is connected to the second portion, e.g., in use.

The first and/or second apertures may define or comprise a profile or cross section. The first and/or second aperture and/or the profile of the first and/or second aperture may comprise a load bearing surface or portion, which may substantially match or complement a profile or shape of the pin and/or a load bearing surface or portion of the pin. The load bearing surface of the first and/or second apertures may be in contact with the load bearing surface of the pin when the first portion is connected to the second portion by the pin, in use. The load bearing surface may define or comprise the contact area between the pin and the first and/or second aperture. The load bearing surface of the pin may transfer or distribute a load to the first and/or second portion via the load bearing surface of the first and/or second aperture.

The first and/or second aperture and/or the profile of the first and/or second apertures may comprise a non-load bearing surface or portion, which may provide clearance around the pin during insertion. By providing clearance or space between the pin and the first and/or second apertures, insertion or installation of the pin may be facilitated. The first and/or second apertures may define or comprise a substantially oval or egg-shaped profile or cross section, or that of two overlapping circles of differing radii.

Beneficially, the first and second apertures are aligned in said pre-selected rotational disposition. In the pre-selected rotational disposition, the profile of the first and second aperture may be aligned. During installation and/or removal of the pin, the non-load bearing surfaces of each of the first and second aperture may be substantially aligned, such as concentrically aligned. When the first and second apertures are aligned, the load bearing surface or contact area of the first aperture may be located or positioned substantially opposite or opposed to the load bearing surface or contact area of the second aperture. By arranging the load bearing surface of the first aperture substantially opposite the load bearing surface of the second aperture, a load may be transferred through the load bearing surfaces to the first and/or second portion, in use.

In use, the ROV may mate and/or release the first and second portions, e.g. subsea/underwater, and/or to insert and/or remove the pin.

The pin may have a tapered end, which may facilitate insertion thereof into the apertures. The pin may comprise a further inter-engaging coupling arrangement configured for locking the pin with respect to the subsea connector. The further inter-engaging coupling arrangement may comprise a bayonet configuration carried or provided by the pin and the second portion.

Subsequently, the ROV may remove the temporary sheave member which may lead to a reduction in tension of the work line or wire.

In use, the ROV may disconnect the work line or wire from the male portion by disengaging the first line connection means from the second line connection means.

Beneficially, the first portion, second portion and/or pin may be made from a metal or metallic material. Beneficially the first portion, second portion and/or pin are made by forging.

The first portion may be connected to one or more lines, such as one or more mooring, tethering or anchoring lines or the like. The one or more lines may be a chain, wire, rope or the like. The first portion may be connected to one or more lines so as to allow rotational movement of the first portion with respect to one or more lines. The rotational movement of the first portion may be about a transverse axis, e.g. discrete transverse axis, of the first portion, e.g. perpendicular to a longitudinal axis of the first portion. A means for connecting the first portion to one or more lines may allow rotational movement of the first portion, e.g. rotational movement about the transverse axis of the first portion. For example, the first portion may be connected to one or more lines by one or more first bearing means, which may be provided or carried by the first portion. In some examples, the first bearing means may define or comprise a clevis arrangement or the like.

The second portion may be connected to a subsea structure. The second portion may be connected to a subsea structure so as to allow rotational movement of the second portion with respect to a subsea structure. The rotational movement of the second portion may be about a transverse axis, e.g. discrete transverse axis, of the second portion, e.g. perpendicular to a longitudinal axis of the second portion. A means for connecting the second portion to a subsea structure may allow rotational movement of the second portion, e.g. rotational movement about the transverse axis of the second portion. The transverse axis of the second portion may be a substantially horizontal axis. The transverse axis of the first portion may be or be oriented substantially perpendicular to the transverse axis of the second portion. By connecting the second portion to a subsea structure so as to allow rotational movement about the transverse axis of the second portion, fabrication of the means for connecting the second portion to a subsea structure may be facilitated. By allowing rotational movement of the second portion about the transverse axis thereof, weight of the means for connecting the second portion to a subsea structure may be reduced.

For example, the second portion may be connected to a subsea structure by one or more second bearing means, which may be provided or carried by the second portion. The second bearing means may comprise one or more trunnions or protrusions, which may provide the transverse axis of the second portion. The bearing means may provide rotational movement about a transverse axis of the second portion with respect to the subsea structure. By allowing rotational movement of second portion about a transverse axis thereof, loads and/or stresses, for example in a longitudinal direction or axis of the second portion, which may act on the second portion and/or a subsea structure, may be reduced, e.g. when the second portion is connected to the first portion and/or to a subsea structure, in use.

The transverse axis of the first portion may be substantially orthogonal or perpendicular to the transverse axis of the second portion, in use, e.g. when the first and second portions are connected. In some examples, the transverse axis of the first portion may be offset, e.g. offset in a longitudinal direction of the first portion and/or second portion, from the transverse axis of the second portion, e.g. there may be a space or distance between the transverse axis of the first portion and the transverse axis of the second portion. The transverse axis of the first portion and/or the transverse axis of the second portion may define a universal-joint arrangement, such as an extended universal-joint arrangement. In other examples, the transverse axis of the first portion may coincide with the transverse axis of the second portion.

In use, insertion of the male part into the female part may cause (longitudinal) rotational movement of the male part into the pre-selected rotational disposition in the female part. The (longitudinal) rotational movement of the male part may align the transverse axis of the first portion relative to the transverse axis of the second portion. The male part may be aligned so that the transverse axis of the first portion is substantially perpendicular to the transverse axis of the second portion.

The means for connecting the first portion to one or more lines may define or allow movement, such as rotational movement, of the first portion with respect to one or more lines, comprising at least one first degree of freedom. The means for connecting the first portion to one or more line may provide a connection or joint comprising the at least one first degree of freedom. The means for connecting the second portion to a subsea structure may define or allow movement, such as rotational movement, of the second portion relative to a subsea structure, comprising at least one second degree of freedom. The means for connecting the second portion to a subsea structure may provide a further connection or joint comprising the at least one second degree of freedom. In use, connection of the first portion to the second portion may allow movement, e.g. rotational movement, with two or more degrees of freedom, of one or more lines relative to a subsea structure. The transverse axes of the first and second portion, which may provide the two or more degrees of freedom, may be orthogonal or perpendicular. The means for connecting the first portion to one or more lines and/or the means for connecting the second portion to a subsea structure may provide movement of the line relative to a subsea structure in two or more directions and/or planes.

By providing movement of one or more lines relative to a subsea structure in two or more degrees of freedom, loading and/or stress on a subsea structure and/or the connector may be reduced e.g. when a vessel connects to a subsea structure, in use.

According to a second aspect of the present invention there is provided a first portion of a subsea connector configured for connection to a second portion of the subsea connector by means for pulling the first portion into the second portion.

The means for pulling may be capable of pulling or moving the first portion into alignment within the second portion.

According to a third aspect of the present invention there is provided a second portion of a subsea connector configured for connection to a first portion of the subsea connector by means for pulling the second portion into the first portion.

The means for pulling may be capable of pulling or moving the second portion into alignment within the first portion.

According to a fourth aspect of the present invention there is provided a system for providing a subsea connection between a subsea, underwater or offshore equipment, apparatus or structure and one or more lines, such as mooring lines, the system comprising a subsea connector according to the first aspect of the present invention.

A first portion of the subsea connector may comprise means for connecting to one or more lines, such as mooring lines.

A second portion of the subsea connector may comprise means for connecting to a subsea structure, e.g. a submerged turret loading or a submerged turret production buoy.

The first portion may be connected to one or more lines. Preferably, the connection between the first connector portion and the line may be adapted as to allow rotational movement around or about a (discrete) transverse axis of the first connector portion with respect to line.

The second portion may be connected to the subsea structure. The connection between the second connector portion and the subsea structure may be adapted as to allow rotational movement around or about a (discrete) transverse axis of the second connector portion with respect to subsea structure.

The (discrete) transverse rotational axis of the first portion may be substantially perpendicular to the (discrete) transverse rotational axis of the second portion.

According to a fifth aspect of the present invention there is provided a method of mooring, anchoring or fixing a subsea, underwater or offshore equipment, apparatus or structure by one or more lines comprising the step of connecting at least one line of said lines to a subsea, underwater or offshore equipment, apparatus or structure by using a subsea connector according to a first aspect of the present invention.

According to a sixth aspect of the present invention there is provided a first and a second bearing of a subsea connector comprising first bearing means provided by or carried on a first portion of the subsea connector and second bearing means provided by or carried on a second portion of the subsea connector.

The first and second bearings may be configured for allowing pivotal or rotational movement of the first and second portions when connected to a subsea structure or a line, such as a mooring line. When connected, the first and second portions may pivot or rotate around or about a transverse axis of the first and/or a transverse axis of the second portion.

The first bearing means may comprise a first inner bearing ring/sleeve and a first outer bearing ring or sleeve.

The first portion of the subsea connector may be configured for receiving a first bearing shaft.

The second bearing means may comprise a second bearing shaft, a first inner bearing ring/sleeve and a first outer bearing ring/sleeve.

The first and second inner bearing ring/sleeve may be positioned radially outside the first and second bearing shaft, respectively. The first and second inner ring/sleeve may be configured for allowing rotational movement of the first and second shaft with respect first and second outer ring/sleeve. The first and second inner ring/sleeve may provide a low friction bearing surface, which may be provided by low friction bush, such as an Orkot bush.

The first and second outer bearing ring/sleeve may be positioned radially outside the first and second inner bearing ring/sleeve.

A first surface of the first and second inner bearing ring may be in slidable contact with a first surface of the first and second shaft, respectively.

A second surface of the first and second inner bearing ring may be in slidable contact with a first surface of the first and second outer bearing ring/sleeve, respectively.

The first and second inner bearing rings/sleeves may be configured for providing low friction rotational movement of the first and second shaft with respect to the first and second outer rings/sleeves.

The first portion of the subsea connector may comprise an aperture located on a distal end thereof. The aperture may provide the first outer ring/sleeve, which may be located inside the aperture.

A clevis arrangement may be used for connecting the first portion to the line. The clevis arrangement may comprise a clevis member and a pin or bolt. The clevis arrangement may connect or attach the first portion to one or more lines.

The pin or bolt of the clevis arrangement may act as the first bearing shaft once the first portion is connected to the line. The clevis member may be connected to a free end of the line.

The clevis member may comprise at least one second aperture, e.g. a pair of diametrically opposed apertures, configured for receiving the first bearing shaft.

The first bearing shaft may receivable within the aperture of the first portion and second apertures of the clevis member when such are aligned.

Preferably, the first bearing shaft may be rotatably fixed with respect to the clevis member, i.e. rotational movement of the first bearing shaft with respect to the clevis member may be prohibited.

The first portion may comprise at least one first surface, e.g. a pair of surfaces opposing each other.

The clevis member may comprise at least one second surface, e.g. a pair of surfaces opposing each other.

An at least one first surface(s) and at least one second surface(s) may abut one another once the first portion and clevis member are brought together. At least one spacing member may be located between the at least one first and the at least one second surfaces. The at least one spacing member may provide low friction between the first and second surfaces. The at least one spacing member may be a thrust bearing or washer, such as an Orkot washer.

The second bearing shaft may be provided by at least one protrusion, e.g. a pair of protrusions located on opposite sides on a transverse axis of the second connector portion. The at least one protrusion may be a trunnion or pin, configured for allowing pivotal movement around or about a transverse axis of the second portion with respect to the subsea structure when connected to the subsea structure. Preferably, the trunnion may be adapted to act as the second bearing shaft.

The connection means for connecting the second portion to a subsea structure may comprise at least one further retaining member, e.g. a pair of further retaining members, positioned opposite each other on an outer surface of the subsea structure, may be configured to secure or attach the second portion of the subsea connector to the subsea structure.

The at least one further retaining member may comprise a further first retaining member and a further second retaining member.

The further first retaining member may comprise a recess or slot adapted for receiving the second bearing means. The recess or slot may be substantially upward facing. The further first retaining member may be adapted to prohibit any downward movement and/or movement in a horizontal direction of the second portion with respect to the subsea structure.

The further second retaining member may prevent movement of the second portion along the recess or slot of the further first retaining member. For example, the further second retaining member may be adapted to secure the second portion to the subsea structure and prohibit any upward movement thereof. The further first and second retaining portions may clamp or fix the second outer bearing ring/sleeve with respect to the subsea structure such that any translational and/or rotational movement of the second outer bearing sleeve is prohibited.

At least one second spacing member may be placed between adjacent surfaces of the second portion and the further retaining member(s). The at least one second spacing member may be capable of providing low friction between the second portion and the further retaining member(s) during rotational movement of the second portion with respect to the subsea structure. The at least one second spacing member may be a thrust bearing or washer, such as an Orkot washer.

According to a seventh aspect of the present invention there is provided a first bearing configured for allowing rotational movement of a first portion of a subsea connector with respect to a subsea, underwater or offshore equipment, apparatus or structure, or a mooring line or wire.

According to a eighth aspect of the present invention there is provided a second bearing configured for allowing rotational movement of a second portion of a subsea connector with respect to a subsea, underwater or offshore equipment, apparatus or structure, or a mooring line or wire.

According to a ninth aspect there is provided a bearing system for providing rotational movement of a subsea, underwater or offshore equipment, apparatus or structure with respect to a mooring line or wire in one or more directions, the subsea, underwater or offshore equipment, apparatus or structure being connected to the mooring line or wire by a subsea connector according to a first aspect of the present invention.

The system may comprise first and second bearings.

The first bearing may be provided by connecting a first portion of the connector to one or more lines. The first bearing may be adapted as to allow rotational movement around or about a (discrete) transverse axis of the first connector portion with respect to the line.

The second bearing may be provided by connecting a second portion of the connector to a subsea structure. The second bearing may be adapted as to allow rotational movement around or about a (discrete) transverse axis of the second connector portion with respect to the subsea structure.

The transverse rotational movement of the first portion may be substantially perpendicular to the transverse rotational movement of the second portion.

According to a tenth aspect of the present invention there is provided a method of assembling a first and second bearing of a subsea connector, comprising the steps of producing a first bearing by connecting or mounting a first or second portion of the subsea connector to at least one mooring line or wire, and producing a second bearing by connecting or mounting a first or second portion of the subsea connector to a subsea, underwater or offshore equipment, apparatus or structure according to the sixth aspect of the present invention and connecting the first and second portions of the subsea connector according to a first aspect of the present invention.

It should be understood that the features defined above in accordance with any aspect of the present invention or below in relation to any specific embodiment of the invention may be utilised, either alone or in combination with any other defined feature, in any other aspect or embodiment of the invention.

BRIEF DESCRIPTION OF DRAWINGS

An embodiment of the present invention will now be described by way of example only, and with reference to the accompanying drawings, which are.

DETAILED DESCRIPTION OF DRAWINGS

Figure 1:
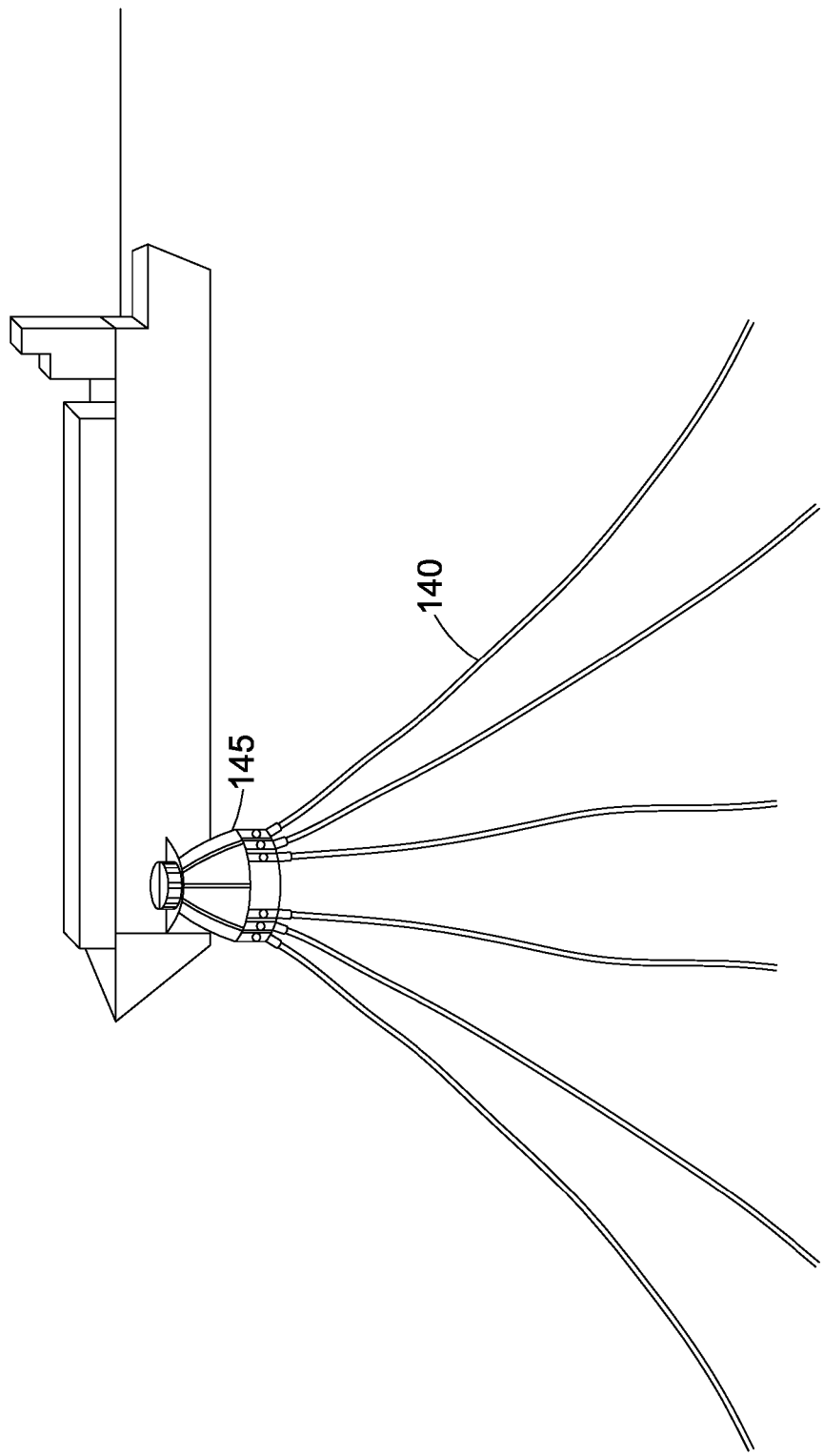
FIG. 1 a schematic view of a subsea structure connected to a vessel with the subsea structure moored to the seabed.

Referring to FIG. 1, there is shown a subsea structure 145 such as a submerged turret loading or a submerged turret production buoy, which in this Figure is shown connected to a vessel. It will be appreciated that the term "submerged" can include both fully submerged (e.g. entirely beneath a waterline) as well as partially submerged (e.g. partially beneath a waterline). As is shown in FIG. 1, the subsea structure 145 is moored to the seabed by one or more mooring lines 140.

Referring to FIGS. 2 to 7, there is shown a subsea connector 100 generally designated 100 according to one embodiment of the present invention. Such a connector may be used for connecting the structure 145 to one or more mooring lines 140. Here, the subsea connector 100 comprises a first portion 105 and a second portion 110. In this example, the first portion 105 may be considered to be a male portion, while the second portion 110 may be considered to be a female portion. The connector 100 further comprises means 115 for connecting the first and second portions 105,110, which comprises at least part of a through-passage 120 in the second portion 110, as will be explained. The means 115 for connecting may comprise means 115 for releasably connecting.

Figure 3:
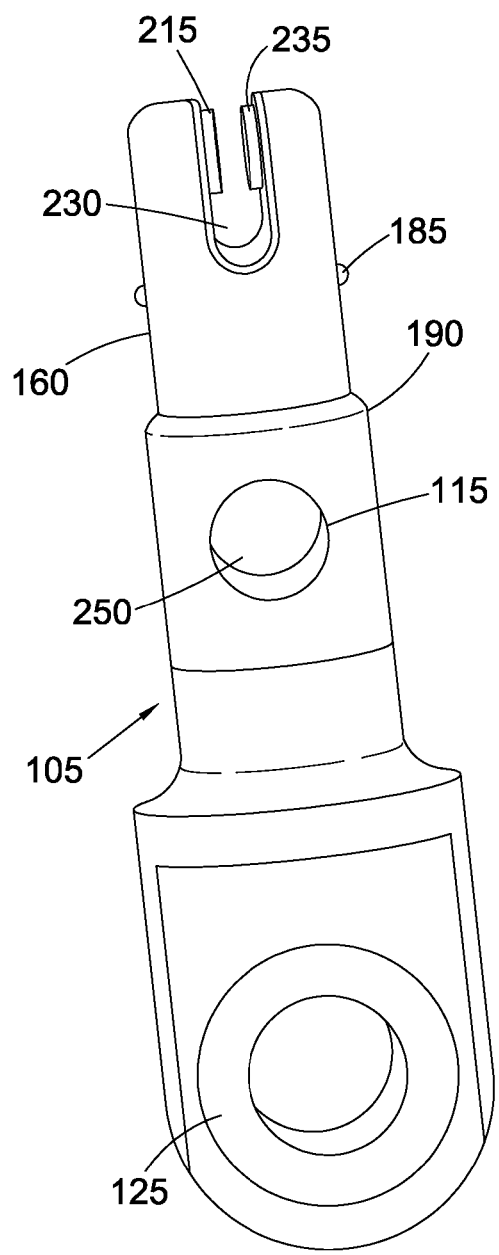
FIG. 3 a schematic view of a first portion of the subsea connector of FIG. 2.

Referring to FIG. 3, there is shown the first portion 105 of a subsea connector 100 configured for connection to the second portion 110 of the subsea connector 100 by means for pulling 200 (see FIG. 7a) the first portion 105 into the second portion 110. The means for pulling 200 are capable of pulling or moving the first portion 105 into alignment within the second portion 110. Of course, in other embodiments, the second portion 110 of a subsea connector 100 may be configured for connection to the first portion 105 of the subsea connector 100 by means for pulling 200 the second portion 110 into the first portion 105, where the means for pulling may be capable of pulling or moving the second portion into alignment within the first portion.

Figure 5:
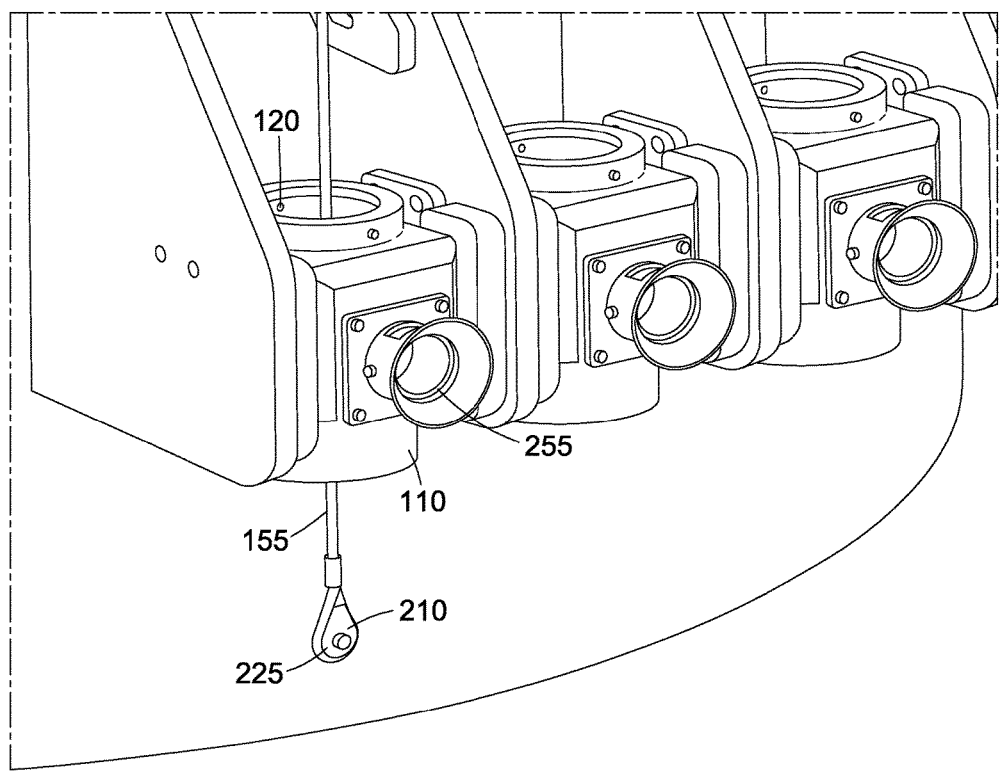
FIG. 5 a schematic view of a second portion of the subsea connector of FIG. 2 with a work wire run through a bore thereof.

Here, at least part of the first portion 105 is receivable within the at least part of the through-passage 120. Further, the through-passage 120 is capable of receiving (for example threadably receiving) a work line 155 or wire, as will be described, and as is shown in FIG. 5.

Figure 4:
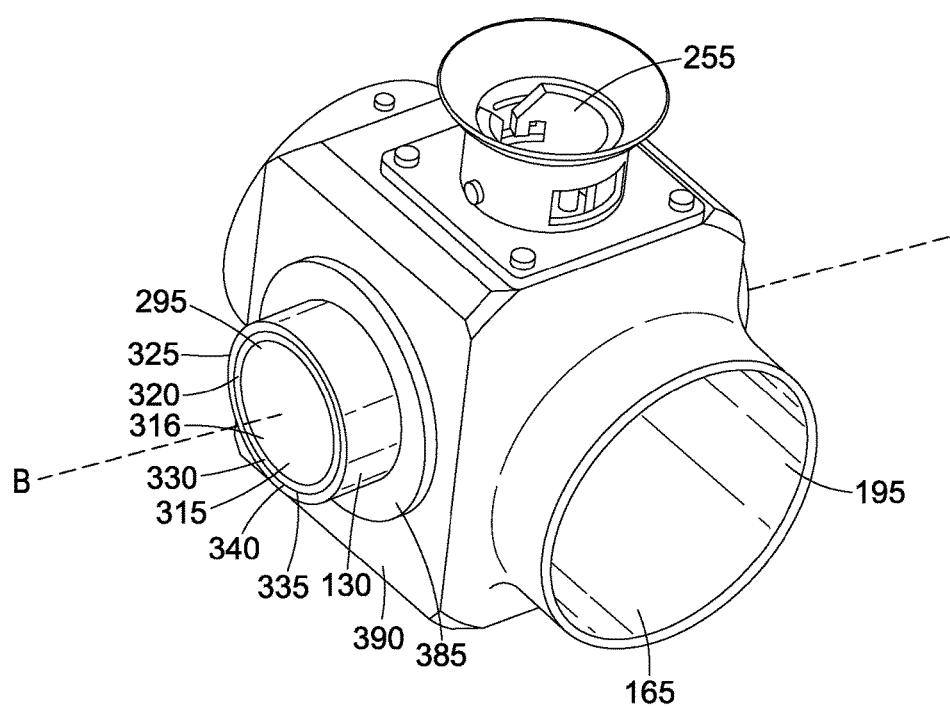
FIG. 4 a schematic view of a second portion and second bearing means of the subsea connector of FIG. 2.

The first portion 105 of the subsea connector 100 further comprises means 125 for connecting to one or more lines 140, such as mooring lines, whereas the second portion 110 comprises means 130 for connecting to the subsea structure 145 (e.g. see FIG. 4).

The means 125 for connecting the first portion 105 to one or more lines 140 allow rotational movement about a transverse axis A of the first portion 105.

The means for connecting the first portion 105 to one or more lines 140 defines or allows movement, e.g. rotational movement, of the first portion 105 with respect to one or more lines 140, comprising at least one first degree of freedom. In some examples, the means 125 for connecting the first portion 105 to one or more lines 140 can provide a joint or connection, which comprises at least one first degree of freedom of rotational movement. In some embodiments, the first portion 105 can be connected to one or more lines 140 by one or more first bearing means 290, which are provided by the first portion 105. In this embodiment, the first bearing 290 means include a clevis arrangement 350 or the like. The transverse axis A of the first portion 105 can be provided by a clevis pin or bolt 360. The clevis arrangement 350 allows rotational movement between the line 140 and the first portion 105 about the clevis pin 360.

The second portion 110 is connected to a subsea structure 145 so as to allow rotational movement of the second portion 110 with respect to a subsea structure 145. The rotational movement of the second portion 110 is about a transverse axis B of the second portion 110, which is perpendicular to a longitudinal axis (not shown) of the second portion 110. The means 130 for connecting the second portion 110 to a subsea structure 145 allow for rotational movement of the second portion about the transverse axis of the second portion, which is in this embodiment a substantially horizontal axis B. By connecting the second portion 110 to a subsea structure so as to allow rotational movement about the transverse axis B of the second portion, fabrication of the means 130 for connecting the second portion 110 to a subsea structure may be facilitated. By allowing rotational movement of the second portion 110 about the transverse axis B, weight of the means 130 connecting the second portion to a subsea structure and/or connector 100 may be reduced.

In this example, the second portion 110 is connected to a subsea structure 145 by one or more second bearing means 295, which can be carried by the second portion 110. The second bearing 145 means comprise one or more trunnions 316. The second bearing means 295 provide rotational movement about the transverse axis B of the second portion 110 with respect to the subsea structure. By allowing rotational movement of second portion 110 about the transverse axis B thereof, loads and/or stresses, for example in a longitudinal direction or axis of the second portion 110, which may act on the connector 100, second portion 110 and/or a subsea structure 145, may be reduced when the second portion 110 is connected to the first portion 105, in use.

Figure 2:
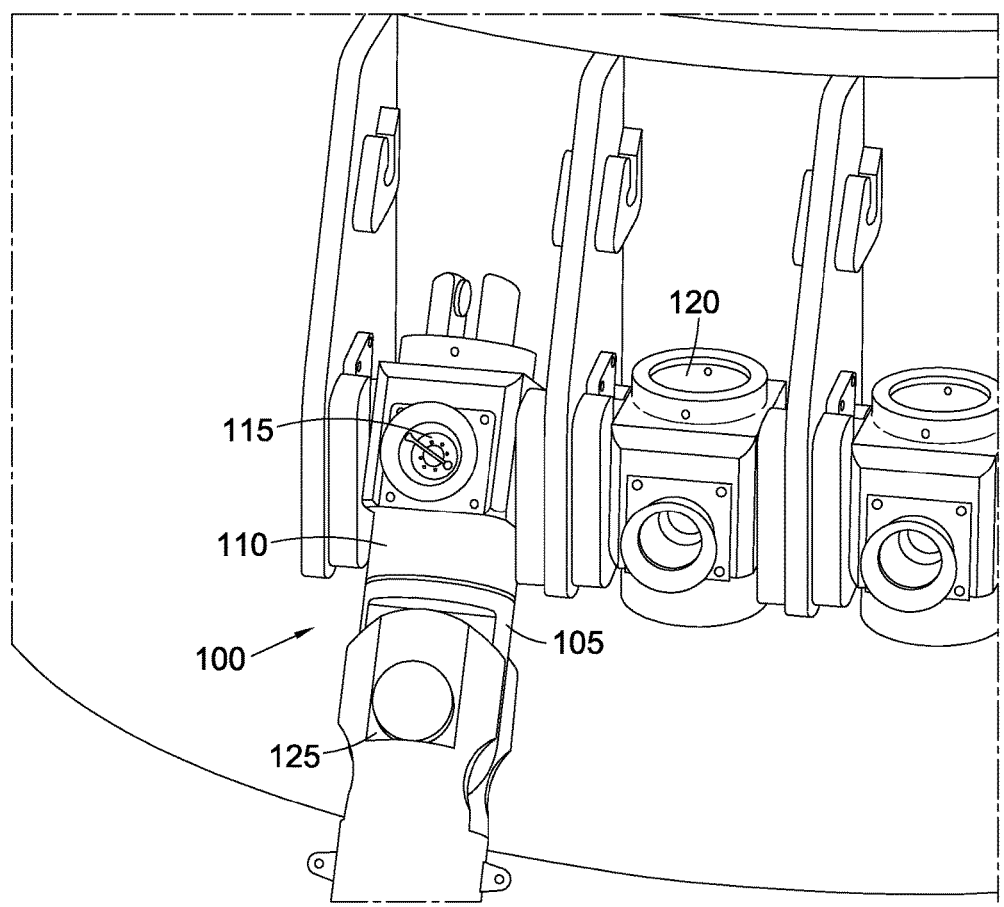
FIG. 2 a schematic view of a subsea connector in accordance with an embodiment of the present invention.
Figure 10:
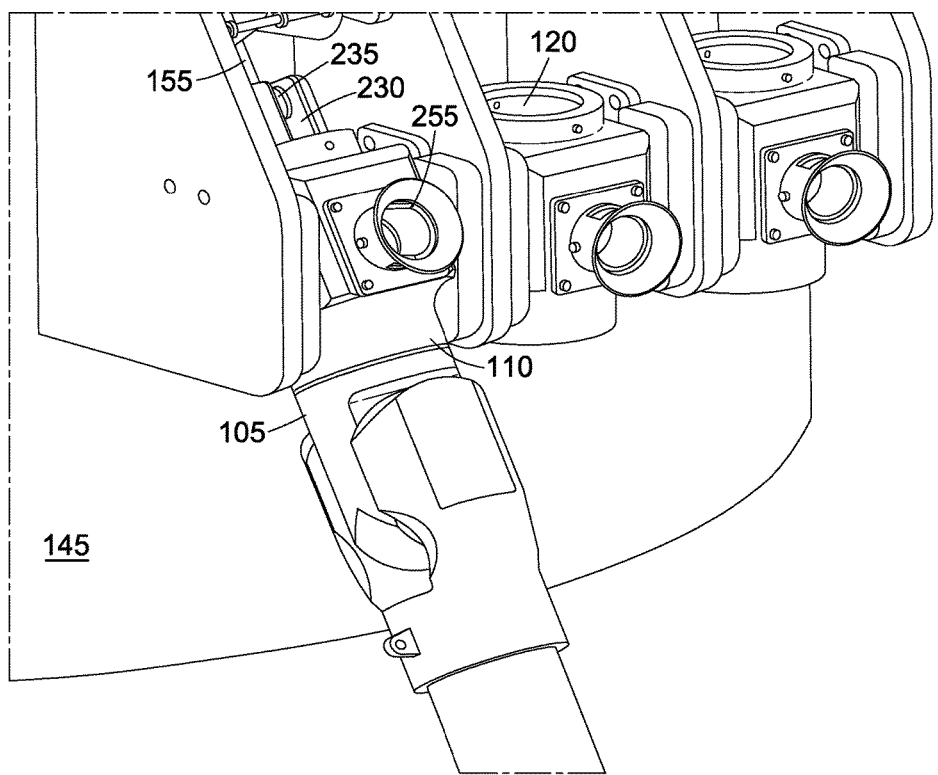
FIG. 10 a schematic view of the subsea connector of FIG. 2; with the first portion received by and within the second portion.
Figure 11:
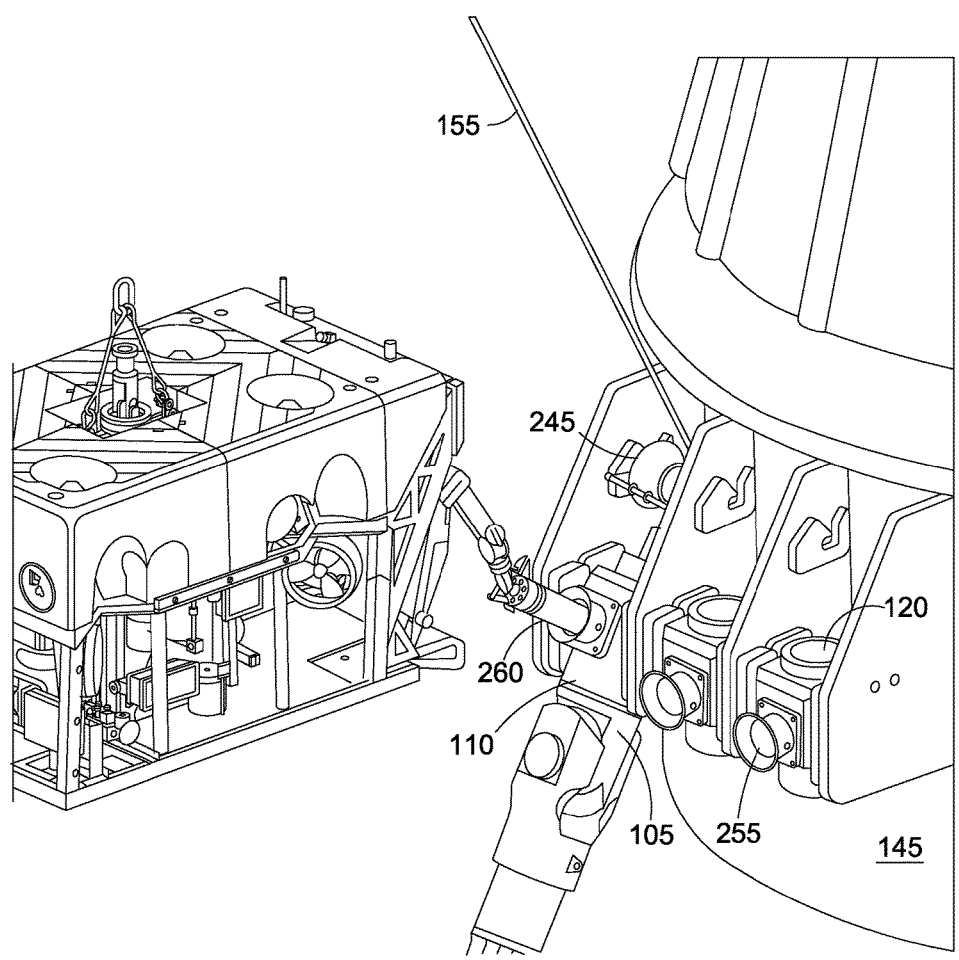
FIG. 11 a schematic view of the subsea connector of FIG. 2 with the pin received within the subsea connector.

As can be seen in FIGS. 2, 10 and 11, the transverse axis A of the first portion 105 is substantially perpendicular to the transverse axis B of the second portion 110, in use, when the first 105 and second 110 portions are connected. In this embodiment, the transverse axis A of the first portion 105 is provided offset in a longitudinal direction of connector 100 from the transverse axis B of the second portion 110 so that there is a space or distance between the transverse axis A of the first portion 105 and the transverse axis B of the second portion 110. The connector in this embodiment has an extended universal-joint arrangement.

The means 130 for connecting the second portion 110 to a subsea structure 145 defines or allows movement, e.g. rotational movement, of the second portion 110 relative to a subsea structure 145, comprising at least one second degree of freedom.

In some examples, the means 130 for connecting the second portion 110 to a subsea structure 145 provide a further joint or connection, which has at least one second degree of freedom of rotational movement. In use, connection of the first portion 105 to the second portion 110 allows rotational movement with two or more degrees of freedom of one or more lines relative to a subsea structure 145. When connected, the first and second connection means allow for movement of the one or more lines 140 relative to the subsea structure 145 in two or more planes and/or directions.

Figure 6:
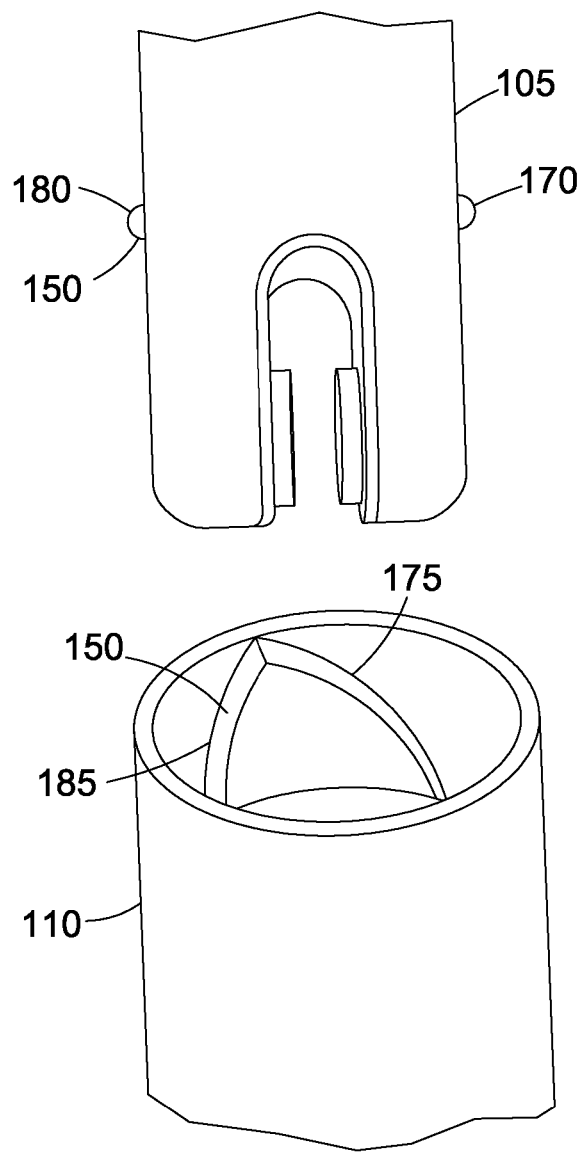
FIG. 6 a schematic view of alignment means of the subsea connector of FIG. 2.
Figure 7A:
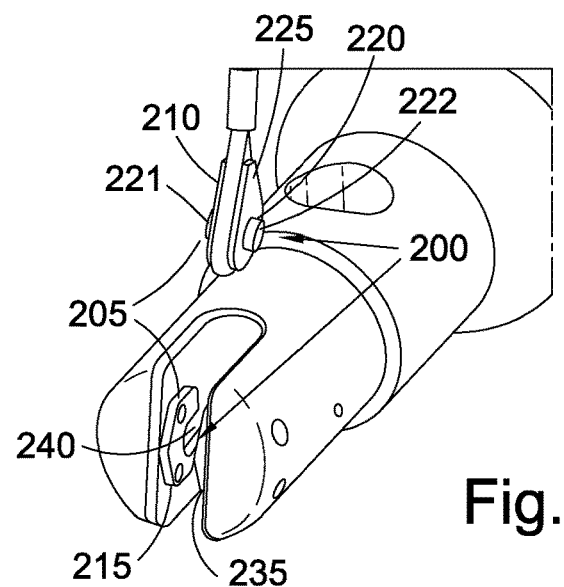
FIG. 7(a) a further schematic view of the first portion of the subsea connector of FIG. 2.
Figure 7B:
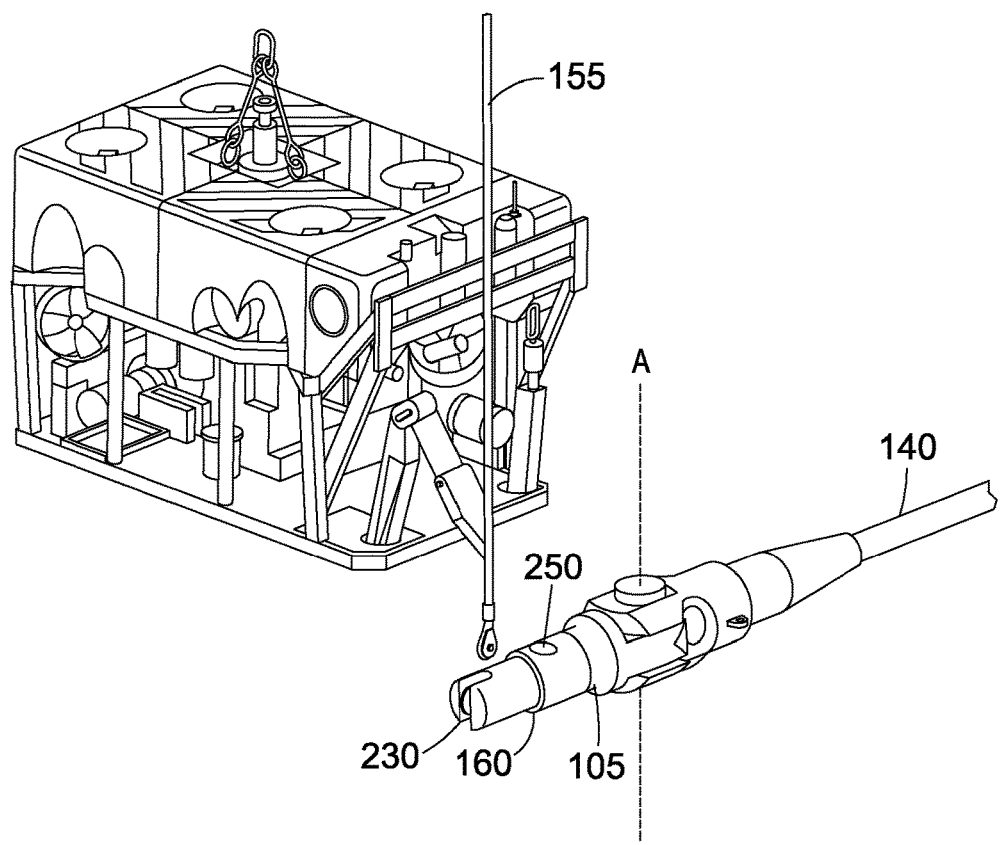
FIG. 7(b) a further schematic view of the first portion of the subsea connector of FIG. 2 connected to a line.

As is shown in FIG. 6, for example, the subsea connector 100 additionally comprises means 150 for aligning, e.g. self-aligning the first portion 105 and the second portion 110 with respect to one another. When brought together so as to be connected, the means 150 for aligning on both the first and second portion interoperate with one another so as to orientate the first portion 110 in a particular configuration with respect to the second portion 120. As is shown on FIG. 6, the means 150 for aligning the first and second portions 105, 110 comprise first and second means 170, 175 carried by, or provided on, the first and second portions 105,110, respectively. Those first and second alignment means 170, 175 co-act, in use, when the first and second portions 105, 110 are brought together. Here, the first alignment means 170 comprises at least one first protrusion 180, and the second alignment means 175 comprises at least one second protrusion 185 also such that the at least one first and second protrusions 180, 185 co-act, in use, and rotate the first and second portions 105, 110 with respect to one another around a longitudinal axis, when the first and second portions 105, 110 are brought together. Of course, in further examples, one or more protrusions and complementary recesses may be provided, as will be appreciated.

As is shown (e.g. in FIG. 3), a male part 160 of the first portion 105 comprises a cylindrical portion 190, whereas the at least part of the through-passage 120 is a cylindrical bore 195 e.g. an open bore (see FIG. 4), such that the female part comprises the through-passage 120, within which the male part 160 or cylindrical portion 190 is received. The male part 160 may be received in a substantially tight or snug fit.

In this example, the first portion 105 also comprises means 205 for releasably connecting to a work line 155 or wire. Here, the line connecting means 205 are an inter-engaging coupling arrangement, although alternative configurations will be evident. The inter-engaging coupling arrangement is configured for pulling, or at least moving, the first portion 105 of the subsea connector 100 towards the second portion 110. The line connecting means 205 comprises first and second line connection means 210, 215, respectively.

In the example shown, the first line connection means 210 is configured for releasably engaging with the second line connection means 215. Alternatively, however, the second line connection means 215 may be configured for releasably engaging with the first line connection means 210. Engagement of the first and second line connection means 210,215 can be caused by tension created between the work line or wire 155 and the first portion 105 of the subsea connector 100.

In this example, the first line connection means 210 is provided by, or carried on, a free end of the line or wire 155, and comprises a first and second protrusion 220 (shown as pins 221, 222) disposed on opposite sides of a plate member or attachment member 225 of the wire or line.

The male part 160 of the first portion 105 comprises an open recess or slot 230 on a free end thereof, and the second line connection 215 means can be located or disposed within the open recess or slot 230 of that male part 160.

The second line connection means 215 also comprises a first and second retaining member 235, which are disposed on opposite sides, opposing each other, of the width of the open recess or slot 230. The first and second retaining members 235 comprise a further opening or recess 240 adapted for receiving the first and second pins 221,222 of the first line connection means 210. Here, the opening or recess 240 of the first and second retaining members 235 is adapted to face opposite to that of the male part 160, e.g. in a downward direction with respect to the first portion 105. In other words, the opening or recess 240 faces inwardly towards the body of the first portion). In alternative embodiments, the second line connection means 215 may comprise an elongate member or bar spanning the width of the open recess or slot 230.

In further alternative embodiments, the first line connection means 210 may comprise a member for connecting to the elongate member or bar of the male part, such as a hook or the like.

In use (e.g. see FIG. 8), an ROV is able to run the work line or wire 155 through the bore 195 of the female part 165, as shown in FIG. 5. The ROV can then connect the work line or wire 155, comprising the first line connection means 210, to the second line connection means 215 of the male part 160.

Figure 8:
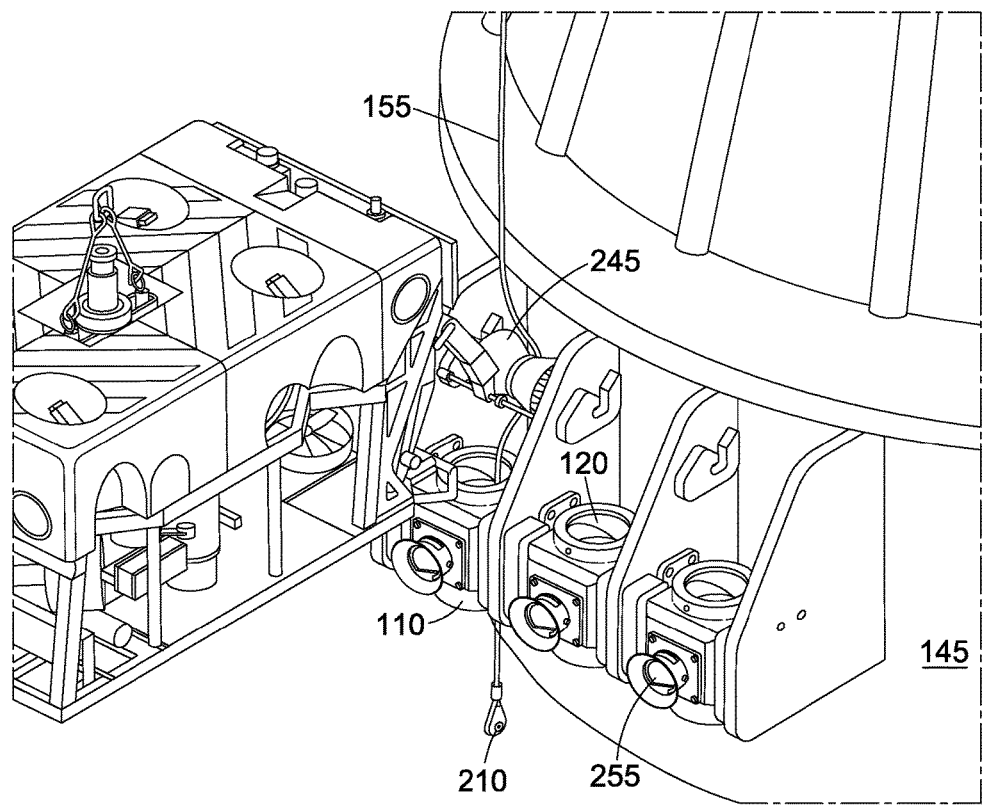
FIG. 8 a schematic view of the second portion of the subsea connector of FIG. 2 connected to subsea structure and temporary sheave member installed.
Figure 9:
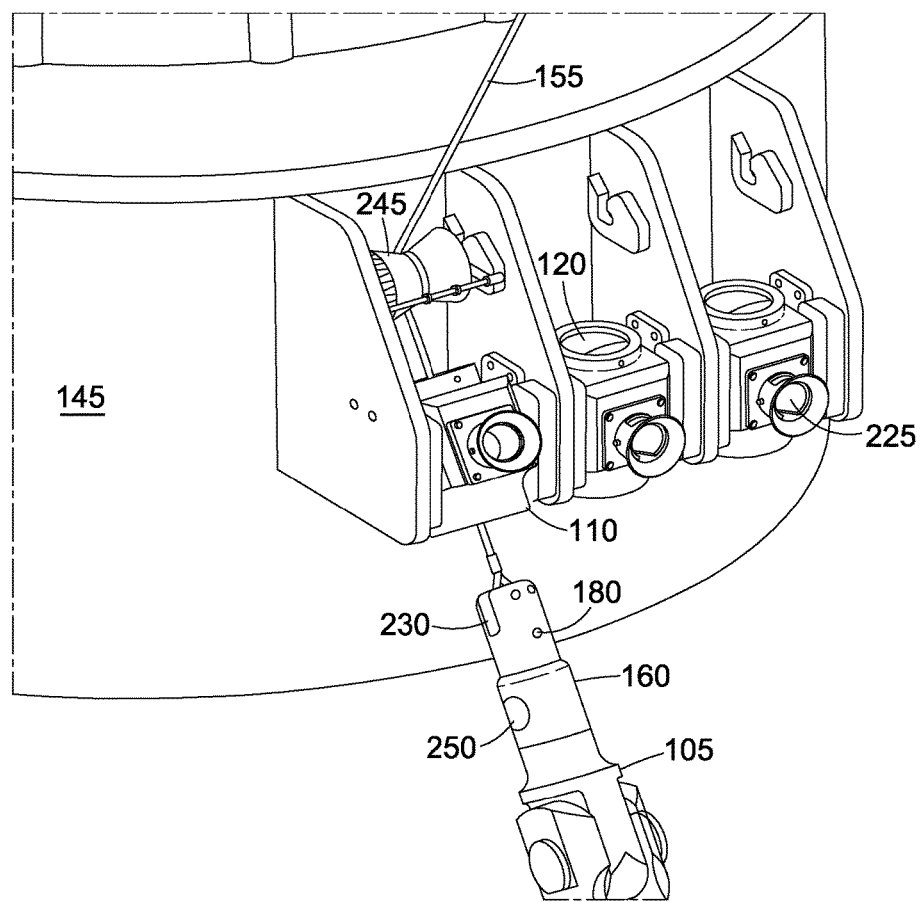
FIG. 9 a schematic view of the subsea connector of FIG. 2, with the first portion being pulled towards the second portion.

With specific reference to FIGS. 7 to 9, engagement between the first and second line connection means 210, 215 can be caused by tension in an upward direction created between the work line or wire 155 and the first portion 105 of the subsea connector 100, e.g. the first and second pins 221, 222 co-act or engage with the first and second retaining members 235. Of course, in alternative examples, a hook or the like may engage with an elongate member (not shown).

Subsequently, the ROV can pull the male part 160 towards the female part 165 such that the male part 160 is inserted into the female part 165. A temporary sheave member 245 facilitates the pulling of the first portion 105 towards the second portion 110, as shown in FIG. 9.

Insertion of the male part 160 into the female part 165 can causes the first alignment means and second alignment means 170, 175 (see FIG. 6) to rotationally co-act, thereby relatively (longitudinally) rotating the male part and the female part into a pre-selected or pre-determined rotational disposition, as shown in FIG. 10.

The means 115 for connecting the first portion and the second portion 105, 110 comprises a first aperture 250 in the male part, e.g. a pair of diametrically or width-wise apertures spanning the cylindrical portion 190 of the male part 160. The means 115 for connecting the first portion and the second portion 105, 110 comprises at least one second aperture 255, e.g. a pair of diametrically opposed apertures, in the female part 165.

Referring to FIG. 11, the means 115 for connecting the first portion 105 and the second portion 110 comprises a pin 260, e.g. a pin, such as a load bearing pin, removably receivable within the first and second apertures 250,255 when are aligned, for example, when aligned in a pre-selected rotational disposition.

As such, the ROV can mate and/or release the first and second portions 105,110, e.g. subsea/underwater, and/or to insert and/or remove the pin 260.

In the example shown, the pin 260 has a tapered end, which can facilitate ease of insertion thereof into the apertures 250,255.

Figure 12:
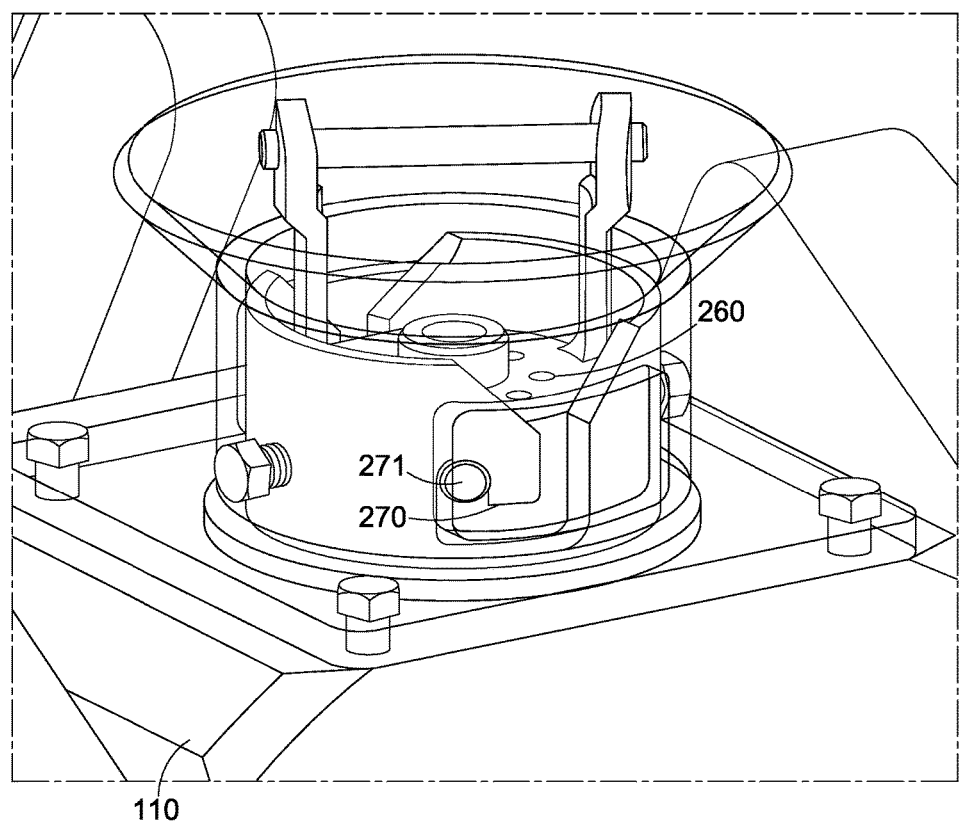
FIG. 12 a schematic view of the inter-engaging coupling arrangement for locking the pin to the subsea connector of FIG. 2.

Referring to FIG. 12, the pin 260 comprises a further inter-engaging coupling arrangement 270 configured for locking, or at least retaining, the pin 260 with respect to the subsea connector 100. In this example, the further inter-engaging coupling arrangement 270 comprises a bayonet configuration 271 carried or provided by the pin 260 and the second portion 110.

Figure 13:
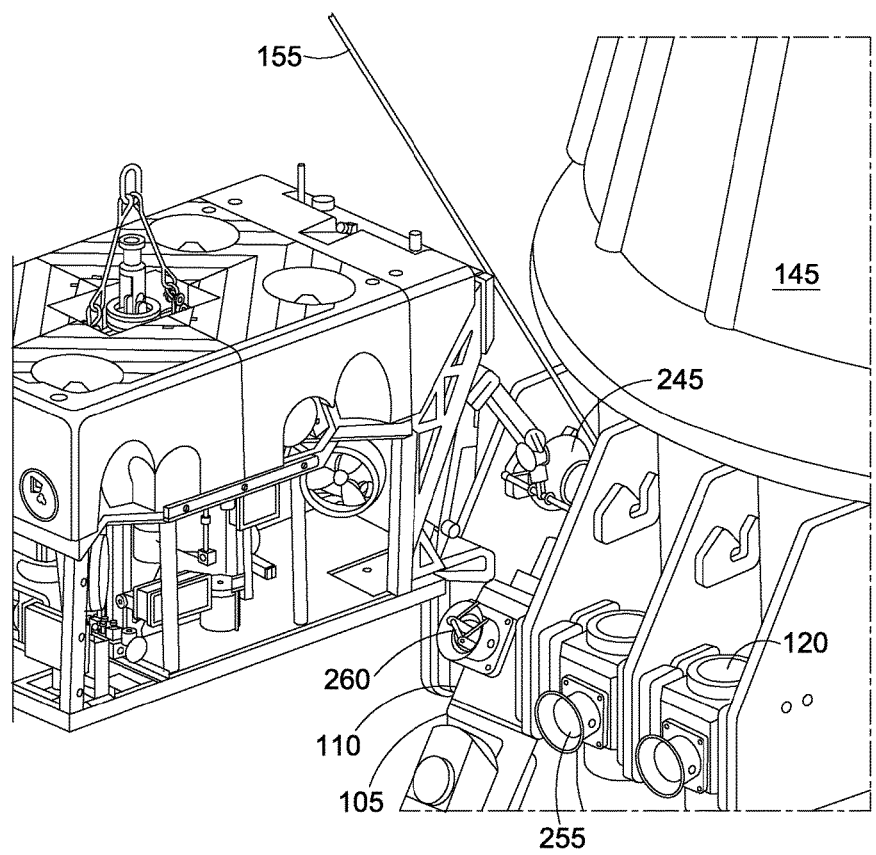
FIG. 13 a schematic view of the subsea connector of FIG. 2 connected to subsea structure and removal of temporary sheave member.
Figure 14:
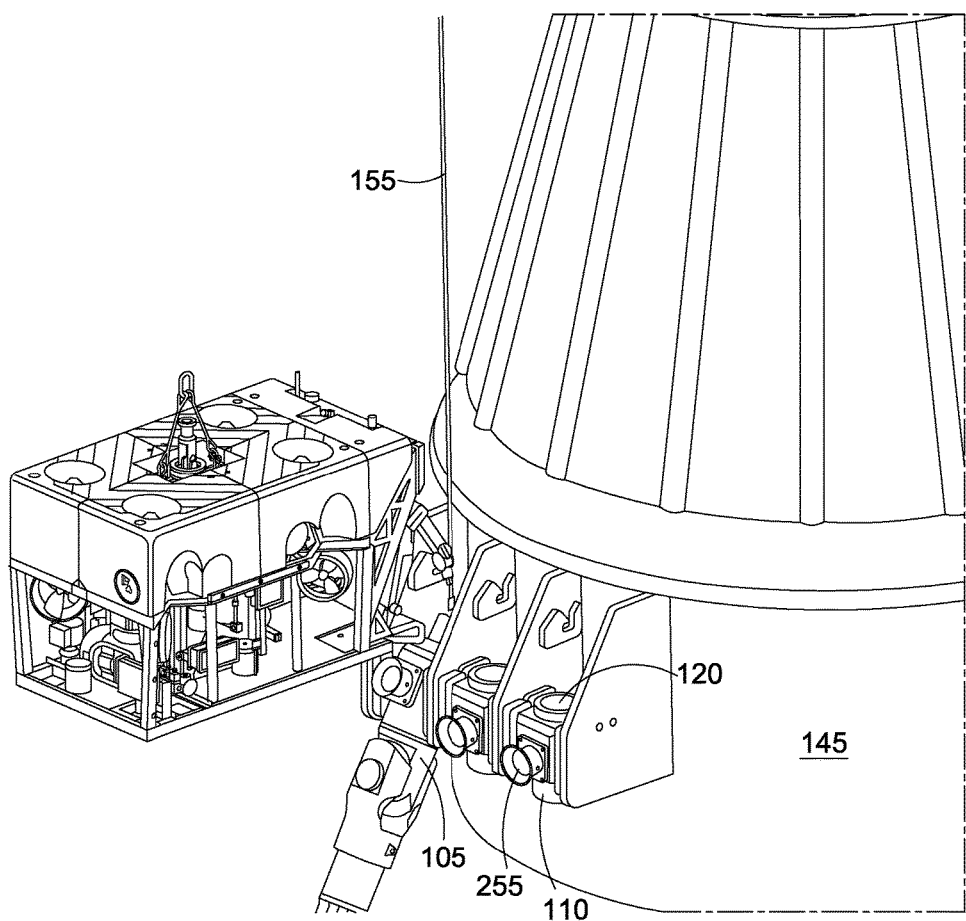
FIG. 14 a schematic view of the subsea connector of FIG. 2 and disengagement of the work wire.

After the pin 260 has been located, and retained, the ROV can remove any temporary sheave member 245, which leads to a reduction in tension of the work line or wire 155, as shown in FIG. 13. The ROV can then disconnect the work line or wire 155 from the male portion 160 by disengaging the first line connection means from the second line connection means 210, 215 (e.g. see FIG. 14).

In some examples, the aforementioned first portion 105, second portion 110 and/or pin 260 are made from a metal or metallic material (e.g. made by forging).

Figure 15:
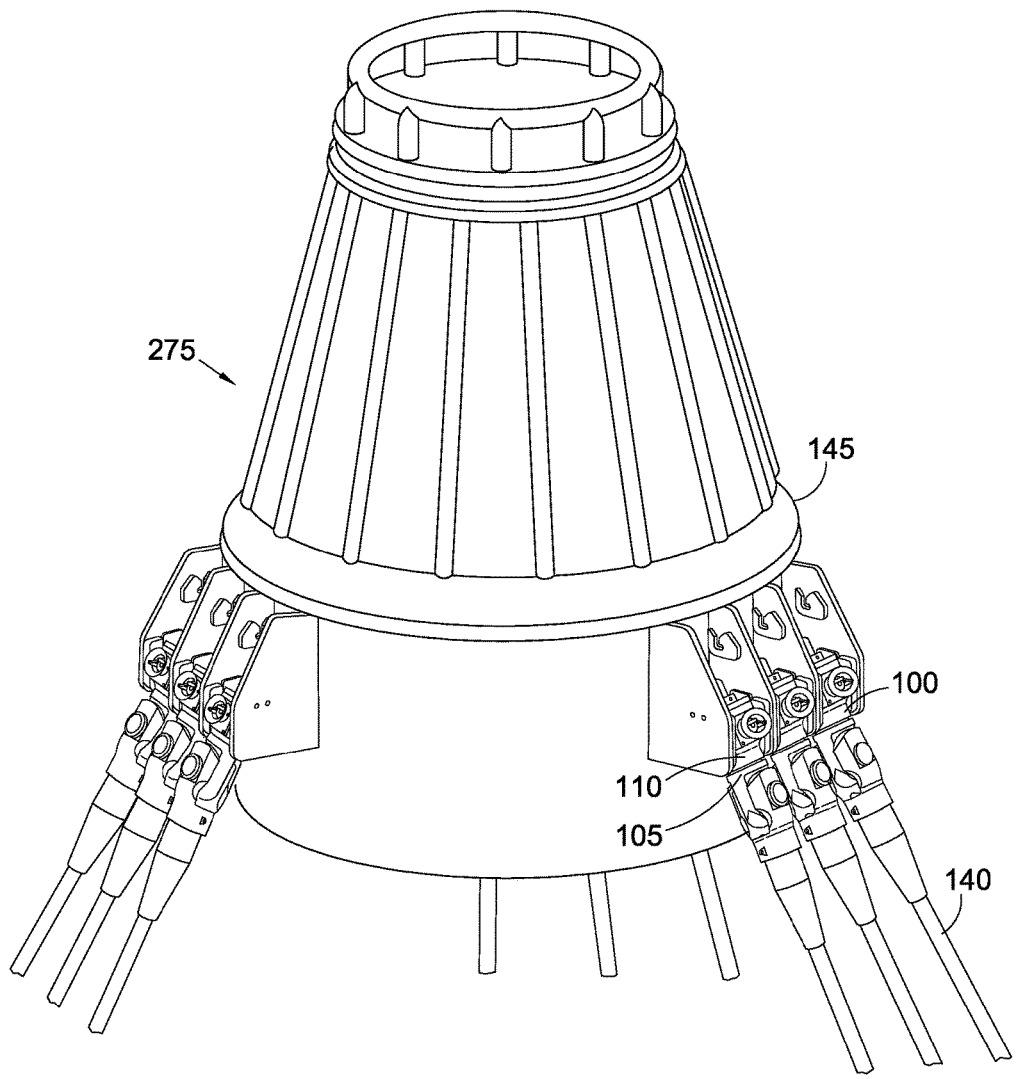
FIG. 15 a schematic view of the subsea structure connected to lines by connector of FIG. 2.
Figure 16:
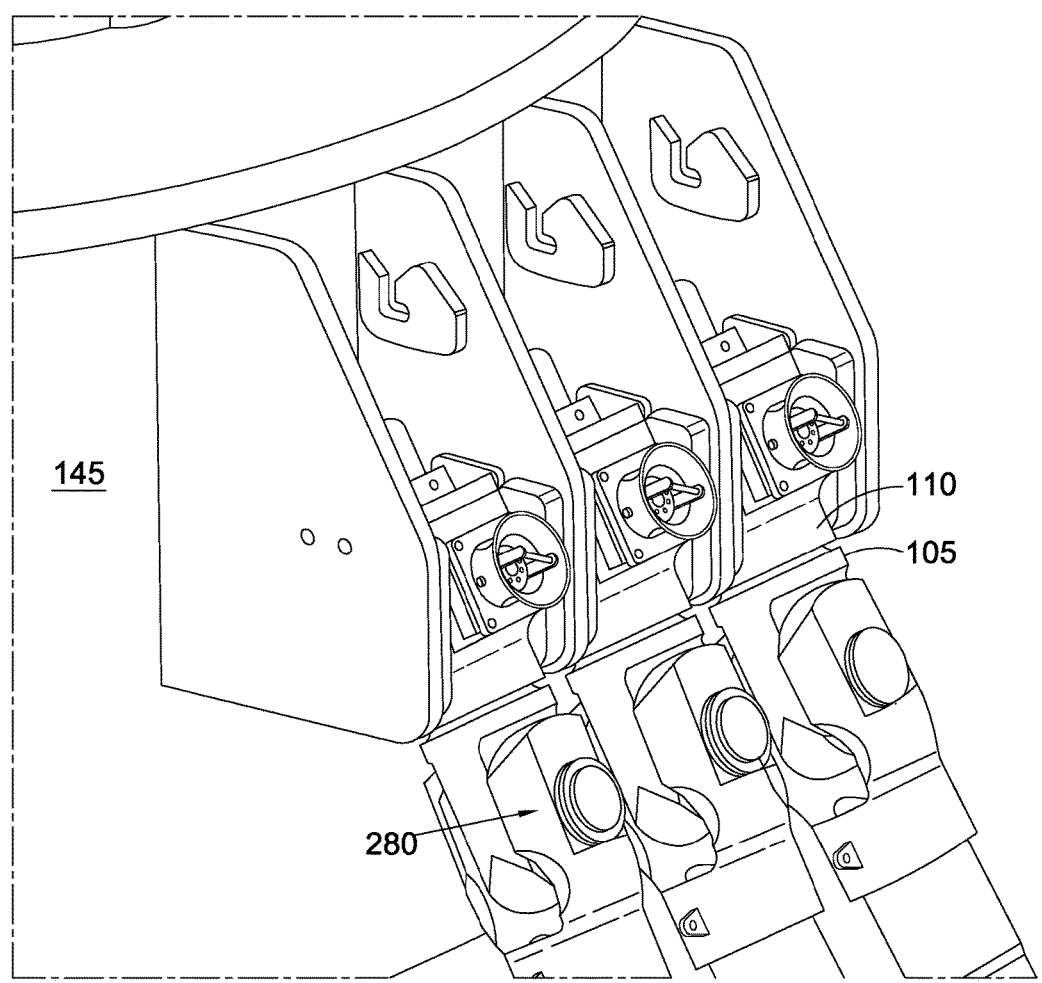
FIG. 16 a schematic view of a first bearing of the subsea connector of FIG. 2.

As will be appreciated, the above described connector 100 may be used with a system 275 comprising one or more such connectors 100. An example of such a system is shown in FIG. 15. Such a system 275 can be used to provide a subsea connection between subsea, underwater and/or offshore equipment, apparatus or structures 145 and one or more lines 140, such as mooring lines. In the example shown, the system 275 comprises a plurality of subsea connectors 100. As is shown, each first portion 105 of each subsea connector 100 has means 125 for connecting to one or more lines 140, such as mooring lines, and each second portion 110 of each subsea connector comprises means 130 for connecting to a subsea structure 145, e.g. a submerged turret loading or a submerged turret production buoy.

It will be appreciated that with such a connector 100 (or system 245) it may be helpful to permit some relative movement, such as rotation, of any mooring line and connected subsea structure. As such, in the embodiment shown, the connection between the first portion 105 and the line 140 is adapted so as to allow for such rotational movement around or about a (discrete) transverse axis A (FIG. 7b) of the first portion 105 with respect to line 140. Further, the connection between the second portion 110 and the subsea structure 145 is adapted so as to allow rotational movement around or about a (discrete) transverse axis B (FIG. 4) of the second portion 110 with respect to subsea structure 145. In the example described, the (discrete) transverse rotational axis A of the first portion 105 may be considered to be substantially perpendicular to the (discrete) transverse rotational axis B of the second portion 105. As such, the use of such a connector may obviate the need for any additional rotation coupling in the mooring line, or the like (e.g. no need for an additional uni-joint, or the like).

With specific reference to FIGS. 16 to 19, and also FIG. 4, there is shown first and second bearings of a subsea connector 100. The first and second bearings comprise first bearing means 290 provided by or carried on the first portion 105 and second bearing means 295 provided by or carried on the second portion 110. The first and second bearings 280,285 are configured for allowing movement (e.g. pivotal movement) of the first and second portions 105,110 when connected to a subsea structure 145 or a line 140. When connected, the first and second portions 105,110 are able to pivot or rotate around or about a transverse axis of the first portion and/or a transverse axis of the second portion.

Here, the first bearing means 290 comprises a first inner bearing ring/sleeve 300 and a first outer bearing ring or sleeve 305. The first portion 105 of the subsea connector 100 may be considered to be configured to receive a first bearing shaft 310.

The second bearing means 295 comprises a second bearing shaft 315, a first inner bearing ring/sleeve 320 and a first outer bearing ring/sleeve 325.

The first and second inner bearing ring/sleeved 300, 320 are positioned radially outside the first and second bearing shaft 310,315, respectively. The first and second inner ring/sleeve 300,320 are configured for allowing rotational movement of the first and second shaft 310,315 with respect first and second outer ring/sleeve 305,325. In this example, the first and second inner ring/sleeve 300,320 provides a low friction bearing surface, which is provided by low friction bush, such as an Orkot bush. The first and second outer bearing ring/sleeves 305,325 are positioned radially outside the first and second inner bearing ring/sleeve 300,320. A first surface 330 of the first and second inner bearing ring/sleeve 300,320 is in slidable contact with a first surface of the first and second shaft 310,315, respectively, and a second surface 335 of the first and second inner bearing ring/sleeve 300,320 is in slidable contact with a first surface 340 of the first and second outer bearing ring/sleeve 305 325, respectively.

As such, the first and second inner bearing rings/sleeves 300,320 are configured for providing low friction rotational movement of the first and second shaft 310, 315 with respect to the first and second outer rings/sleeves 305,325.

As is shown in the Figures, the first portion 105 of the subsea connector 100 comprises an aperture 345, which can be considered to be located on a distal end thereof. The aperture 345 provides the first outer ring/sleeve 305, which is located inside the aperture 345, such that a clevis arrangement 350 can be used for connecting the first portion 105 to the line 140. In the example given, the clevis arrangement 350 comprises a clevis member 355 and a pin or bolt 360 such that the pin or bolt 360 acts as the first bearing shaft 310 once the first portion 105 is connected to the line 140. The clevis member 350 can be considered to be connected to a free end of the line 140.

The first bearing shaft 310 is receivable within the aperture 345 of the first portion 105 and second apertures of the clevis member 350 when such are aligned. Here, the first bearing shaft 310 is rotatably fixed with respect to the clevis member 350, i.e. rotational movement of the first bearing shaft 310 with respect to the clevis member 350 is inhibited, or prohibited.

It may be considered that the first portion 105 comprises at least one first surface 365, e.g. a pair of surfaces opposing each other, while the clevis member 350 comprises at least one second surface 370, e.g. a pair of surfaces opposing each other, such that the respective at least one first surface(s) 365 and at least one second surface(s) 370 abut one another once the first portion 105 and clevis member 350 are brought together. In some examples, a sealing member 375 may be located between the at least one first and the at least one second surfaces 365,370. Such a sealing member 375 may be provide low friction between the first and second surfaces 365,370. An example of such a sealing member 375 may be an Orkot washer.

The second bearing shaft 315 of the second portion 110 is provided by at least one protrusion 316, e.g. a pair of protrusions located on opposite side on a transverse axis of the second connector portion 110. The at least one protrusion 316 may be considered to be a trunnion, protrusion or pin, configured for allowing pivotal movement around or about a transverse axis B of the second portion 100 with respect to the subsea structure 145 when connected to the subsea structure 145. In some examples, the trunnion 316 is adapted to act as the second bearing shaft 315.

Figure 17:
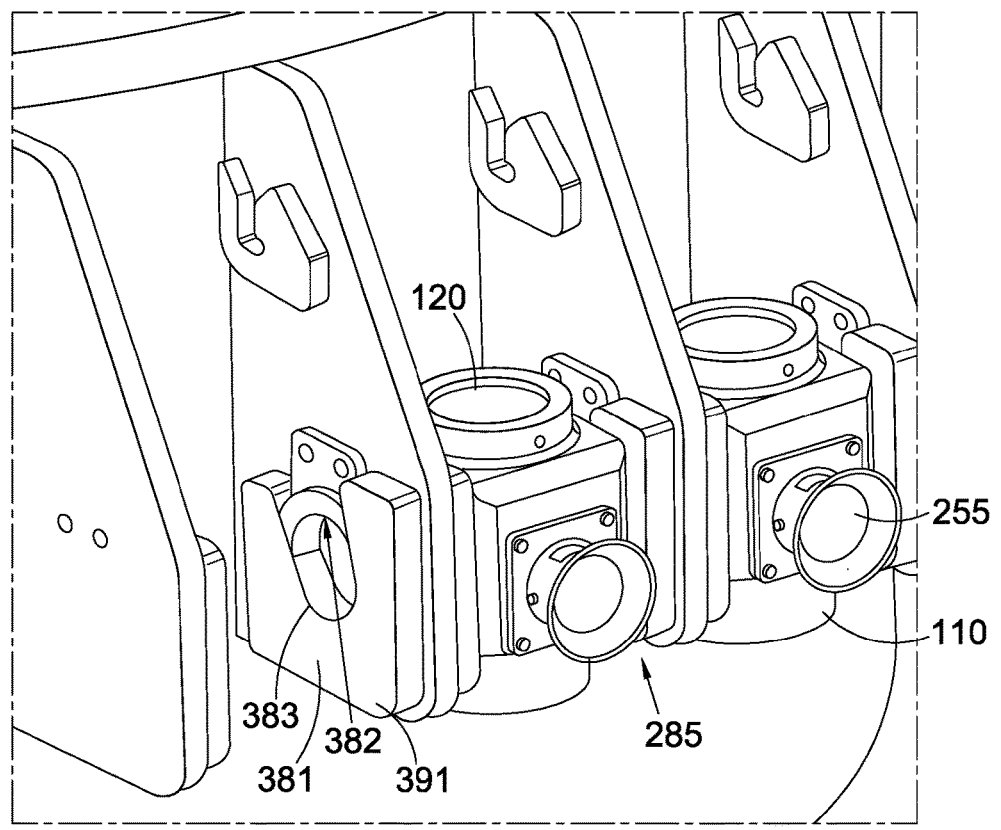
FIG. 17 a schematic view of a second bearing of the subsea connector of FIG. 2.
Figure 18A:
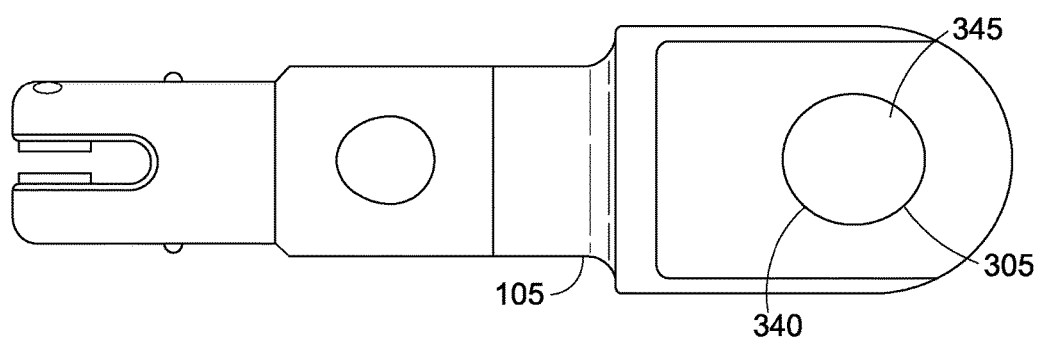
FIG. 18(a) a schematic view of first bearing means of the first portion of subsea connector of FIG. 2.
Figure 18B:
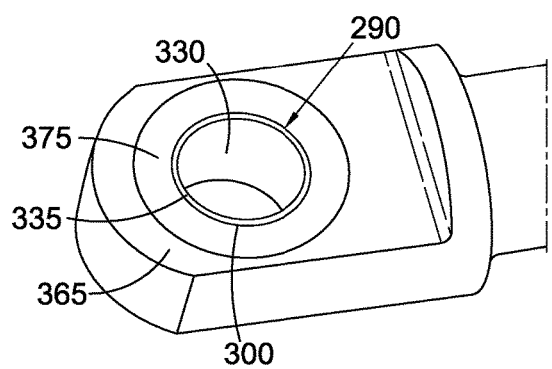
FIG. 18(b) an exploded schematic view of the first bearing means of the first portion of the subsea connector of FIG. 2.
Figure 20:
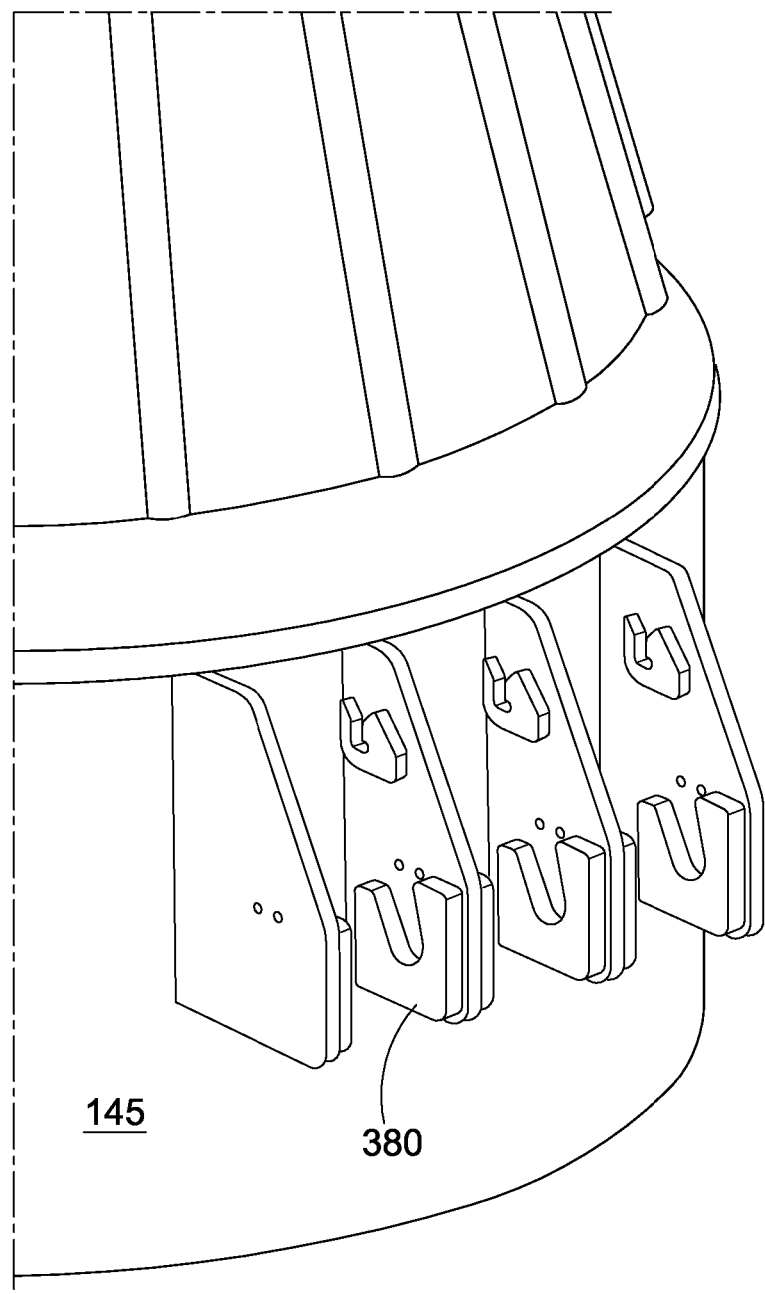
FIG. 20 a schematic view of retaining members configured for securing the second portion of the subsea connector of FIG. 2 to the subsea structure.

With specific reference to FIGS. 17 and 20, for example, at least one further retaining member 380, e.g. a pair of further retaining members, are positioned opposite each other on an outer surface of the subsea structure 145, and are configured to secure or attached the second portion 105 of the subsea connector 100 to the subsea structure 145. Here, the at least one further retaining member 380 comprises a first retaining member 381 and a second retaining member 382. The further first retaining member 381 comprises an upward facing recess 383 adapted for receiving the second bearing means 295 such that the first retaining member 381 is adapted to prohibit any downward movement and/or movement in a horizontal direction of the second portion 110 with respect to the subsea structure 145. In a similar manner, the second retaining member 382 is adapted to secure the second portion 110 to the subsea structure 145 and prohibit any upward movement thereof. The further first and second retaining portions 381,382 clamp or fix the second outer bearing ring/sleeve 325 with respect to the subsea structure 145.

A second spacing member 385 is placed between contacting surfaces 390,391 of the second portion 110 and the first and second retaining members 381,382. The second spacing member 385 is capable of providing low friction between the second portion 110 and the first and second further retaining members 381,382 during rotational movement of the second portion 110 with respect to the subsea structure 145. As above, the second spacing member 385 may be an Orkot washer, or the like.

Figure 19:
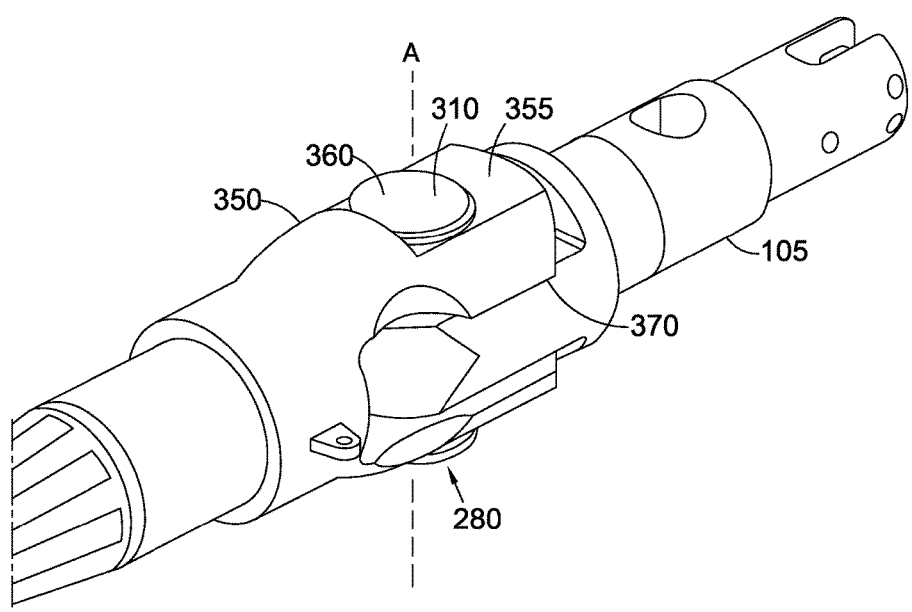
FIG. 19 a schematic view of a clevis arrangement for connection of first portion of the subsea connector of FIG. 2 to a line.

Referring to FIG. 19, and as explained above, there is provided a first bearing 280 that is configured to allow for rotational movement of the first portion 105 of the subsea connector 100 with respect to a subsea, underwater or offshore equipment, apparatus or structure 145, or a mooring line or wire 140. Further, and referring to FIG. 17, there is shown, and as has been described, a second bearing 285 configured for allowing rotational movement of the second portion 110 of a subsea connector with respect to a subsea, underwater or offshore equipment, apparatus or structure 145, or a mooring line or wire 140. Such a bearing system 395 can provide rotational movement of a subsea, underwater or offshore equipment, apparatus or structure 145 with respect to a mooring line or wire 140 in one or more directions, while that apparatus or structure is connected to the mooring line or wire by a subsea connector 100.

While in the above example first and second bearings have been described, it will be appreciated that in other systems, only one may be provided.

Figure 21A:
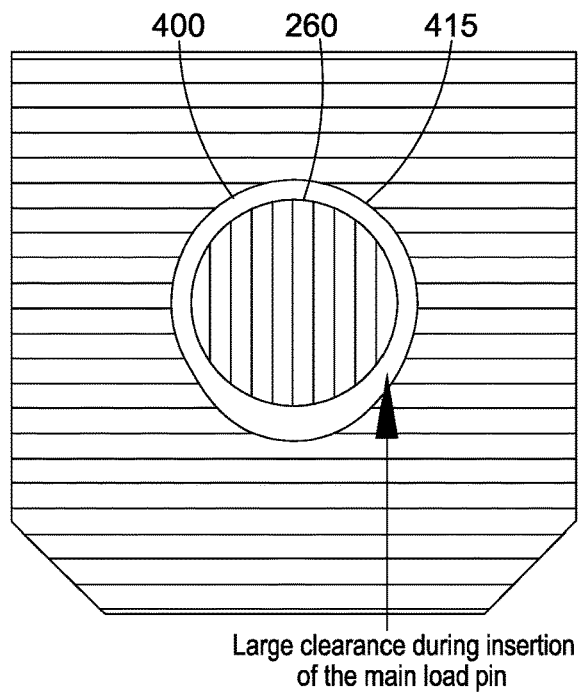
FIG. 21(a) a cross sectional view of a first or second aperture of the first or second portion and a pin for connecting the first portion to the second portions of the connector of FIG. 2.

The example of FIG. 21(a) shows the profile or cross section of an aperture 415, for example the profile of a first aperture 250 or second aperture 255, and pin 260. The aperture 415 is configured to provide a clearance or space 400, e.g. large or increase clearance or space 400, around the pin 260 during insertion of the pin 260, as shown in FIG. 21(a).

Figure 21B:
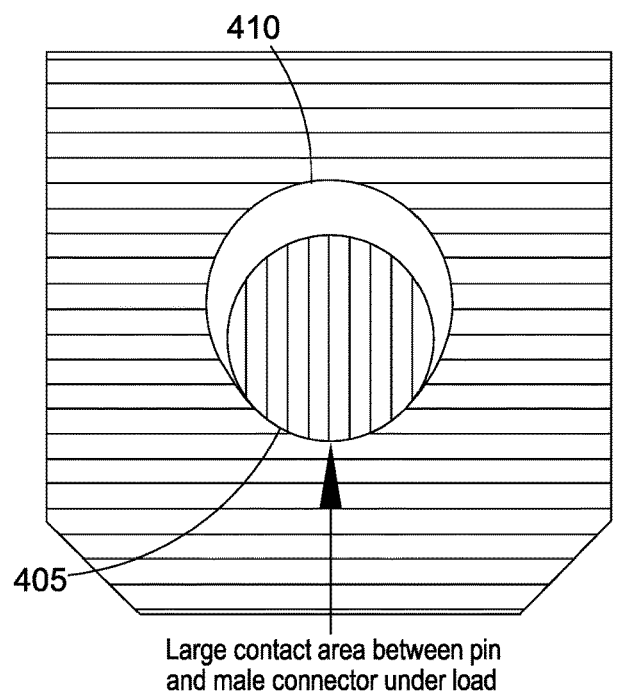
FIG. 21(b) a cross sectional view of a first or second aperture of the first or second portion and a pin for connecting the first portion to the second portions of the connector, wherein the pin is contact with a load bearing surface of the first or second aperture of the connector of FIG. 2.

As shown in FIG. 21(b), the aperture 415 can also be configured to provide a contact area between the pin 260 and the aperture 415. For example, when the first 105 and second 110 portions are assembled and the connector is under loading conditions, the pin 260 will be pulled into contact with the contact area. In this example, the profile of the aperture 415 is substantially oval or egg shaped. In other examples, the aperture 410 can have a profile, which is substantially that of two overlapping circles.

The profile of the aperture 415 comprises a load bearing surface 405, which substantially matches or complements a profile of the pin 260 and/or a load bearing surface of the pin 260. For example, a pin 260 with circular cross section can be used, and the load bearing surface 405 can be designed to be an arc or the like with substantially the same radius as that of the pin 260. The load bearing surface 405 of the aperture 410 is in contact with the pin when, for example, the first portion is connected to the second portion is in use, as shown in FIG. 21(b).

In some examples, the profile of the aperture 415 comprises a non-load bearing surface 410, which can provide clearance 400 around the pin 260 during insertion, as shown in FIG. 21(a). By providing clearance 400 between the pin and the aperture 410, insertion or installation of the pin may be facilitated.

The first aperture 250 and/or the second aperture 255 can have a profile substantially as shown by the aperture 415 in FIG. 21(a). When aligned, the load bearing surfaces 405 of the first aperture 250 and second aperture 255 can be substantially opposite each other.

During installation and/or removal of the pin 260, the non-load bearing surface 410 of each the first 250 and second 255 apertures are substantially aligned, such as concentrically aligned. When the first 250 and second 255 apertures are aligned the load bearing surface 405 or contact area of the first aperture is substantially opposite or opposed to the load bearing surface 405 or contact area of the second aperture 255. By arranging the load bearing surface 405 of the first aperture 250 substantially opposite the load bearing surface 405 of the second aperture 255, a load may be transferred through the load bearing surfaces 405 to the first 105 and/or second 110 portion, in use.

During installation, tension is maintained on the work line or wire 155, pulling the first aperture 250 and second aperture 255 into alignment, which may allow an ROV to insert the pin 260. By maintaining tension on the work wire 155 clearance 400 may be provided, which can facilitate installation of the main load bearing pin 260.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of any claims. The applicant indicates that aspects of the invention may consist of any such individual feature or combination of features. In view of the foregoing description it will be evident to a person skilled in the art that various modifications may be made within the scope of the invention, and that the description provides only one example embodiment of how the invention may be implemented.

The invention claimed is:

1. A subsea connector comprising:
   a first portion;
   a second portion; and
   a connection arrangement that connects the first and second portions,
   wherein the connection arrangement comprises at least part of a through-passage in the second portion,
   wherein the first portion comprises a first connection arrangement that connects the first portion to one or more lines, the first connection arrangement allowing rotational movement around or about a transverse axis of the first portion with respect to the one or more lines,
   wherein the second portion comprises a second connection arrangement that connects the second portion to a subsea structure, the second connection arrangement allowing rotational movement around or about a transverse axis of the second portion with respect to the subsea structure; and
   wherein the transverse axis of the first portion is substantially orthogonal or perpendicular to a transverse axis of the second portion, in use, when the first and second portions are connected.

2. A subsea connector according to claim 1, wherein at least part of the first portion is receivable within the at least part of the through-passage.

3. A subsea connector according to claim 1, wherein the subsea connector further comprises an alignment arrangement for aligning the first portion and the second portion with respect to one another.

4. A subsea connector, comprising:
   a first portion;
   a second portion; and
   a connection arrangement that connects the first and second portions,
   wherein the connection arrangement comprises at least part of a through-passage in the second portion,
   wherein the through-passage is capable of receiving a work line or wire, and
   wherein the first portion comprises at least part of a means for releasably connecting to the work line or wire, and engagement between the at least part of the releasable line connection means and the work line or wire is caused by tension between the first portion and the work line or wire.

5. A subsea connector according to claim 1, wherein the first connection arrangement comprises one or more bearings.

6. A subsea connector according to claim 1, wherein the second connection arrangement comprises one or more bearings.

7. A subsea connector according to claim 6, wherein the one or more bearings comprises one or more protrusions or trunnions, the one or more protrusions or trunnions providing the transverse axis of the second portion.

8. A subsea connector according to claim 1, wherein a transverse axis of the first portion coincides with or is offset from a transverse axis of the second portion.

9. A subsea connector according to claim 1, wherein a transverse axis of the first portion and a transverse axis of the second portion define a universal joint arrangement.

10. A subsea connector according to claim 1, wherein the first portion comprises a male part and the second portion comprises a female part, insertion of the male part into the female part causing rotational movement of the male part into a pre-selected rotational disposition in the female part.

11. A subsea connector according to claim 10, wherein the rotational movement of the male part aligns a transverse axis of the first portion relative to a transverse axis of the second portion so that the transverse axis of the first portion is substantially perpendicular to the transverse axis of the second portion.

12. A subsea connector according to claim 1, wherein the first connection arrangement defines or allows rotational movement of the first portion with respect to the one or more lines comprising at least one degree of freedom.

13. A subsea connector according to claim 12, wherein the first connection arrangement provides a connection or joint comprising the at least one degree of freedom.

14. A subsea connector according to claim 1, wherein the second connection arrangement defines or allows rotational movement of the second portion relative to a subsea structure comprising at least one degree of freedom.

15. A subsea connector according to claim 14, wherein the second connection arrangement provides a further connection or joint comprising the at least one degree of freedom.

16. A subsea connector according to claim 1, wherein, in use, connection of the first portion to the second portion allows movement of the one or more lines relative to a subsea structure with two or more degrees of freedom.

17. A subsea connector according to claim 1, wherein the first portion comprises a first connection arrangement and the second portion comprises a second connection arrangement, the first and second connection arrangements providing movement of one or more lines relative to a subsea structure in two or more directions or planes.

18. A subsea connector according to claim 3, wherein the alignment arrangement comprises first and second alignment elements carried by or provided on the first and second portions, respectively, the first and second alignment elements co-acting, in use, when the first and second portions are brought together.

19. A subsea connector according to claim 18, wherein the first alignment element comprises at least one first protrusion and the second alignment element comprises at least one second protrusion.

20. A subsea connector according to claim 19, wherein the at least one first and second protrusions co-act, in use, and rotate the first and second portions with respect to one another around a longitudinal axis, when the first and second portions are brought together.

21. A subsea connector according to claim 18, wherein the first portion comprises a male part and the second portion comprises a female part, in use, insertion of the male part into the female part causes the first alignment element and second alignment element to rotationally co-act, thereby relatively rotating the male part and the female part into a pre-selected or pre-determined rotational disposition.

22. A subsea connector according to claim 1, wherein the first portion comprises a male part and the second portion comprises a female part, the connection arrangement comprising at least one of:
 a first aperture in the male part;
 a second aperture in the female part; and
 a pin, removably receivable within the first aperture in the male part and the second aperture in the female part, when the male and female parts are aligned.

23. A subsea connector according to claim 22, wherein the first or second aperture is configured to provide at least one of:
 a clearance or space between the pin and the first aperture or the second aperture during insertion of the pin; and
 a contact area between the pin and the first or second aperture when the first portion is connected to the second portion.

24. A subsea connector according to claim 22, wherein the first or second apertures define or provide a profile or cross-section, the profile of the first or second aperture comprising at least one of:
 a load bearing surface or portion, which substantially matches or complements a profile or shape of the pin or a load bearing surface or portion of the pin;
 a load bearing surface or portion, which substantially matches or complements a profile or shape of the pin and a load bearing surface or portion of the pin; and
 a non-load bearing surface or portion, which provides clearance around the pin during insertion.

25. A subsea connector according to claim 24, wherein the load bearing surface of the first or second aperture is in contact with the load bearing surface of the pin when the first portion is connected to the second portion by the pin, in use.

26. A subsea connector according to claim 24, wherein during installation or removal of the pin, the non-load bearing surface of each aperture is substantially aligned.

27. A system for providing a subsea connection between a subsea, underwater or offshore equipment, apparatus or structure and one or more lines, the system comprising:
 a subsea connector according to claim 1; and
 at least one of:
  a subsea, underwater or offshore equipment, apparatus or structure; and
  one or more lines.

28. A system according to claim 27, wherein the system comprises a pair of retaining members, the pair of retaining member being positioned opposite each other on an outer surface of the subsea structure, and being configured to secure or attached to a second portion of the subsea connector to the subsea structure.

29. A method of mooring, anchoring or fixing a subsea, underwater or offshore equipment, apparatus or structure by one or more lines comprising the step of connecting at least one line of said lines to a subsea, underwater or offshore equipment, apparatus or structure by using a subsea connector according to claim 1.

30. The method according to claim 29, wherein the method comprises at least one of the steps of:
 running a work line or wire through the through-passage of a female part of the subsea connector;
 connecting a work line or wire to a male part of the subsea connector;
 pulling a male part of the subsea connector towards a female part of the subsea connector such that the male part is inserted into the female part;
 mating the first and second portions;
 inserting a pin within first and second apertures of the subsea connector; and
 disconnecting a work line or wire from a male portion of the subsea connector.

31. A subsea connection arrangement comprising:
 a subsea connector according to claim 1, the connector comprising at least part of a line connection arrangement for releasably connecting to a work line or wire; and
 a wire or work line, the line being adapted to be releasably connectable to the at least part of the releasable line connection arrangement of the first portion.

32. A subsea connection arrangement according to claim 31, wherein engagement between the at least part of the releasable line connection arrangement is caused by tension between a first portion and a work line or wire.

33. A subsea connection arrangement according to claim 31, wherein the releasable line connection arrangement comprises a first line connection element provided on the work line or wire and a second line connection element provided on the first portion.

34. A subsea connection arrangement according to claim 33, wherein the first line connection element comprises a first and a second protrusion disposed on opposite sides of a plate member or attachment member of the wire or work line.

35. A subsea connection arrangement according to claim 33, wherein the first portion comprises a male part, the male part comprising an open recess or slot on a free end thereof, the second line connection element being located or disposed within the open recess or slot of the male part.

36. A subsea connector according to claim 4, wherein the first portion comprises at least one of:

a first connection arrangement that connects the first portion to one or more lines, the first connection arrangement allowing rotational movement around or about a transverse axis of the first portion with respect to the one or more lines; and a male part.

37. A subsea connector according to claim 4, wherein the second portion comprises at least one of:

a second connection arrangement that connects the second portion to a subsea structure, the second connection arrangement allowing rotational movement around or about a transverse axis of the second portion with respect to the subsea structure; and a female part.

38. A subsea connector according to claim 4, wherein the transverse axis of the first portion is substantially orthogonal or perpendicular to a transverse axis of the second portion, in use, when the first and second portions are connected.

* * * * *